US008410659B2

(12) United States Patent
Chang

(10) Patent No.: US 8,410,659 B2
(45) Date of Patent: Apr. 2, 2013

(54) ELECTROMECHANICAL TRANSDUCER AND MANUFACTURING METHOD THEREFOR

(75) Inventor: Chienliu Chang, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 12/673,232

(22) PCT Filed: Sep. 19, 2008

(86) PCT No.: PCT/JP2008/067589

§ 371 (c)(1),
(2), (4) Date: Feb. 12, 2010

(87) PCT Pub. No.: WO2009/041675

PCT Pub. Date: Apr. 2, 2009

(65) Prior Publication Data

US 2011/0095645 A1 Apr. 28, 2011

(30) Foreign Application Priority Data

Sep. 25, 2007 (JP) ................................ 2007-246920
Sep. 16, 2008 (JP) ................................ 2008-236379

(51) Int. Cl.
*H02N 1/00* (2006.01)
*H04R 31/00* (2006.01)

(52) U.S. Cl. ........... 310/309; 600/459; 381/191; 29/594

(58) Field of Classification Search .................. 310/309; 600/459; 73/718, 514.32; 381/174, 191; *H01N 1/00*
See application file for complete search history.

(56) References Cited

U.S. PATENT DOCUMENTS 6,426,582 B1 * 7/2002 Niederer et al. .............. 310/309
7,037,746 B1 * 5/2006 Smith et al. ...................... 438/53
(Continued)

FOREIGN PATENT DOCUMENTS

JP 2005027186 A 1/2005
JP 2006050314 A 2/2006
(Continued)

OTHER PUBLICATIONS

Oxford English Dictionary, Oct. 28, 2011, Definition of "plastically" and "moulding", http://www.oed.com/.*

(Continued)

*Primary Examiner* — Tran Nguyen
*Assistant Examiner* — Thomas Truong
(74) *Attorney, Agent, or Firm* — Fitzpatrick, Cella, Harper & Scinto

(57) ABSTRACT

An electromechanical transducer includes a vibration membrane provided with a first electrode, a substrate provided with a second electrode, and a support member adapted to support the vibration membrane in such a manner that a gap is formed between the vibration membrane and the substrate, with the first and second electrodes being arranged in opposition to each other, wherein a part of the vibration membrane and a part of the substrate are in contact with each other at a contact region, and another region of the vibration membrane other than the contact region is able to vibrate; an overlap region is provided between the first electrode and second electrode in the contact region, and at least one of these electrodes has a through portion formed therethrough in at least a part of the overlap region, and a plurality of protrusions formed within the gap and on at least one of the vibration member and the support member, wherein the contact region is surrounded by the plurality of protrusions.

14 Claims, 17 Drawing Sheets

U.S. PATENT DOCUMENTS

| | | | | |
|---|---|---|---|---|
| 7,047,814 | B2 * | 5/2006 | Zias et al. | 73/718 |
| 8,008,835 | B2 * | 8/2011 | Degertekin | 310/309 |
| 2005/0200241 | A1 | 9/2005 | Degertekin | |
| 2006/0004289 | A1 * | 1/2006 | Tian et al. | 600/459 |
| 2007/0052093 | A1 * | 3/2007 | Machida et al. | 257/735 |
| 2007/0161896 | A1 | 7/2007 | Adachi et al. | |
| 2009/0031548 | A1 | 2/2009 | Zaitsu et al. | |

FOREIGN PATENT DOCUMENTS

| | | | |
|---|---|---|---|
| JP | 2006319712 | A | 11/2006 |
| WO | 03/009319 | A1 | 1/2003 |

OTHER PUBLICATIONS

Notification of Transmittal of the International Search Report and the Written Opinion of the International Searching Authority in related corresponding International Appln. No. PCT/JP2008/067589.

Baris Bayram, Capacitive Micromachined Ultrasonic Transducer Design for High Power Transmission, IEEE Transactions on Ultrasonics, Ferroelectrics, and Frequency Control, Feb. 2005, pp. 326-339, vol. 52, No. 2.

* cited by examiner

ELECTROMECHANICAL TRANSDUCER AND MANUFACTURING METHOD THEREFOR

TECHNICAL FIELD

The present invention relates to an electromechanical transducer and a method for manufacturing the same. The electromechanical transducer of the present invention is an acoustic transducer of a capacitive type particularly suitable for transmission or reception of an ultrasonic wave.

BACKGROUND ART

In recent years, there have been actively researched or studied capacitive, ultrasonic transducers using micromachining processes (CMUT; Capacitive Micromachined Ultrasonic Transducer). Hereinafter, such a capacitive ultrasonic transducer is referred to as a CMUT. According to such a CMUT, there can be easily obtained a broadband characteristic that is excellent both in a liquid and in an air by transmitting and receiving an ultrasonic wave by the use of a vibration membrane. Therefore, with ultrasonic diagnostics using this CMUT, it becomes possible to make an ultrasonic diagnosis with higher precision than with a conventional medical diagnostic modality, and hence ultrasonic diagnostics is being noted as a promising technology in these days.

This CMUT has a construction in which a vibration membrane provided with an upper electrode and a substrate provided with a lower electrode are arranged in opposition to each other, and the vibration membrane is supported by a support member so as to form a gap between the vibration membrane and the substrate (see Japanese patent application laid-open No. 2006-319712). When this is driven to operate, an electrostatic attraction force is first generated between both the electrodes by applying a DC voltage to the lower electrode, so that the vibration membrane is thereby caused to deform. In addition, by superimposing a fine AC voltage thereon, the vibration membrane is vibrated to oscillate an ultrasonic wave. When the ultrasonic wave is received, the vibration membrane is caused to deform by reception of the ultrasonic wave, whereby the interval or distance between both the electrodes is changed, and a resultant change in the capacitance between both the electrodes is detected as a signal.

In order to enhance the mechano-electric transducing characteristic, it is desirable to decrease the interelectrode interval between the upper electrode provided at a vibration membrane side and the lower electrode provided at a substrate side. Therefore, by applying a high DC voltage, the vibration membrane can be deformed more greatly so as to make the above-mentioned interelectrode interval narrow. However, the application of such a high voltage also poses a problem in putting the formation of a surface insulation film on the transducer into practical use so as to avoid resultant adverse effects. In case where the CMUT with such a high voltage applied thereto is used for acoustic diagnostics, an unfavorable influence might be caused on human bodies.

In the past, as an example in which an interelectrode interval is made narrow by application of a low voltage, U.S. Pat. No. 6,426,582 discloses a CMUT which will be described below. In this U.S. Pat. No. 6,426,582, a vibration membrane is caused to deform downward, and in such a deformed state, a resist resin is heated and coated around the vibration membrane. Thereafter, the resist is cooled to harden, and the vibration membrane is fixed in its periphery with its shape being naturally deformed in a downward direction, whereby an interval between capacitive electrodes is formed to be small. In addition, this U.S. Pat. No. 6,426,582 adopts a construction in which the interelectrode interval is controlled by protrusions. That is, the construction adopted is such that the protrusions are formed on a lower side of the vibration membrane, and they alone are in contact with an underlayer substrate, with the central portion of the vibration membrane being not in contact with the underlayer.

On the other hand, in recent years, a collapse mode has being noted as a new operation mode different from a conventional mode that is an ordinary operation mode in a CMUT. This collapse mode means an operation mode in which when a DC voltage is applied to a lower electrode, a vibration membrane is attracted to an underlayer electrode under the action of a DC electrostatic force thereof, so that the vibration membrane is thereby made into a collapsed or crushed state in which it is caused to operate while being in contact with the lower electrode. In addition, this specific voltage is called a collapse voltage.

In this collapse mode, it is said that sensitivity and driving ability are higher than the above-mentioned conventional mode (see IEEE Transactions on Ultrasonics, Ferroelectrics, and Frequency Control, Vol. 52, No. 2, February 2005, p. 326-339). In this collapse mode, unlike the conventional, mode in which a gap exists between the vibration membrane and the substrate, there is generated, in part of the vibration membrane including the upper electrode, a region that is in contact with a region of the substrate including the lower electrode. In this state, an ultrasonic wave can be oscillated or emitted by superposing a minute AC voltage to make those portions of the vibration membrane other than the contact region thereof vibrate by means of this minute AC voltage. In addition, an ultrasonic wave can also be received, just like in the above-mentioned conventional mode.

On the other hand, in order to operate the CMUT in the above-mentioned collapse mode, it is necessary to apply an extremely high DC voltage so as to place the vibration membrane into contact with the lower electrode. The DC voltage (collapse voltage) needed here is in the range of from about 130 to 150 V, and the CMUT can not be kept operating in this mode when such a voltage can not be provided. However, it is extremely difficult to put a circuit operating with such a high voltage to practical use, and in case where the MDT, being operated with such a high voltage, is used for acoustic diagnostics, unfavorable influences might be exerted on human bodies. Moreover, if such a high voltage is applied, the vibration membrane might cause dielectric breakdown, thereby making the lower electrode and the upper electrode be short-circuited to each other.

In the past, in Japanese patent application laid-open No. 2005-27186, there has been proposed a CMUT which is constructed in the following manner so as to decrease a DC voltage in a collapse mode. In Japanese patent application laid-open No. 2005-27186, a construction is used in which a vibration membrane is attracted with the use of a magnet. Specifically, a part of the vibration membrane including a magnetic material is attracted by a magnetic field from the outside, whereby an interval between capacitive electrodes is decreased, as a result of which a high DC voltage (collapse voltage) is made unnecessary, thus lowering a required voltage.

In addition, in Japanese patent application laid-open No. 2006-50314, a construction is adopted in which a vibration membrane is electrified by a corona discharge treatment, thereby making a high DC voltage (collapse voltage) unnecessary.

As stated above, in order to operate a CMUT in a collapse mode, a high DC voltage of about 130-150 V (collapse voltage) is needed as a DC voltage (collapse voltage). Therefore, as referred to above, there arise problems such as circuit construction, influences on human bodies, a short-circuit between a lower electrode and an upper electrode, etc.

Further, even in the above-mentioned examples that have been proposed for coping with these problems, the following unfavorable influences are given to the vibration mass, the rigidity, the stability, etc., of the vibration membrane.

For instance, in Japanese patent application laid-open No. 2005-27186 in which the lowering of the voltage is intended by the vibration membrane being attracted with the use of the magnet, not only deposition and magnetization of a magnetic material on an upper portion or an internal, portion or a lower portion) of the vibration membrane become necessary, but also a magnetic field forming means is required for the underlayer substrate, resulting in a complicated structure. In addition, there is also a problem in that an amount of initial displacement of the vibration membrane is attracted by the magnetic field, and hence is liable to be influenced by external magnetic fields and external disturbances.

Also, in Japanese patent application laid-open No. 2006-50314 in which a vibration membrane is electrified by a corona discharge treatment, there are the following problems. That is, the amount of electrification by an electrical discharge is liable to be influenced by environmental factors such as humidity, dielectric substances, etc., and the amount of electrification in the vibration membrane and the amount of initial displacement thereof are unstable, and variation between elements is large.

In addition, in U.S. Pat. No. 6,426,582 in which the protrusions are formed on the lower side of the vibration membrane, and they alone are in contact with the underlayer substrate, with the central portion of the vibration membrane being not in contact with the underlayer, only a space formed inside the protrusions vibrates, and those portions outside the protrusions are fixedly held against vibration by means of the resist.

Accordingly, this can not be called operating in a collapse mode in a strict meaning, but if this is converted into a collapse mode, there will be the following problems. That is, in case where the deformed shape of the vibration membrane is kept by such hardening of the resist, the shape of the vibration membrane is changed and is made unstable due to a change over time of the resist, and/or a temperature-related change in property or quality thereof. In addition, because the resist covers an outer periphery of the vibration membrane, there is also another problem that an effective area (filling factor) receiving an ultrasonic wave is decreased.

In addition, in the conventional CMUT, the vibration membrane and the substrate are placed in contact with each other as described above in an operating state of the collapse mode, so the variable capacitance between the upper electrode and the lower electrode decreases, resulting in an increase in parasitic capacitance. That is, in a capacitor, which is formed in a region where the vibration membrane and the substrate of both the electrodes are in contact with each other, the distance between the electrodes does not change even at the time when the vibration membrane is caused to vibrate upon transmission and reception of ultrasonic waves, and hence the capacitor does not contribute to the change in capacitance. Due to such an increase in the parasitic capacitance, there arises a problem that the electromechanical transduction efficiency of the CMUT is reduced, and that the signal detection function of the CMUT is lowered.

DISCLOSURE OF THE INVENTION

In view of the problems as referred to above, the present invention has an object to provide an electromechanical transducer and a method for manufacturing the same which can decrease the voltage required in a stable manner when the transducer is caused to operate in a collapse mode, without reducing an electromechanical transduction efficiency and without lowering a signal detection function.

The present invention provides electromechanical transducers and methods for manufacturing the same which are constructed as follows.

An electromechanical transducer according to the present invention is characterized by comprising: a vibration membrane provided with a first electrode; a substrate provided with a second electrode; and a support member adapted to support the vibration membrane in such a manner that a gap is formed between the vibration membrane and the substrate with these electrodes being arranged in opposition to each other; wherein a part of the vibration membrane and a region of the substrate are in contact with each other, and a remaining region of the vibration membrane other than the contact region is able to vibrate, and wherein there is an overlap region of the first electrode and second electrode in the contact region, and at least one of these electrodes has a through portion formed therethrough in at least a part of the overlap region.

In addition, the electromechanical transducer according to the present invention is characterized in that the vibration membrane has a region in which the contact state with the substrate is kept with no external force being applied to the vibration membrane.

Moreover, the electromechanical transducer according to the present invention is characterized in that in the region in which the contact state is kept, the vibration membrane is fusion bonded to the substrate.

Moreover, the electromechanical transducer of the present invention is characterized in that in the region in which the contact state is kept, the vibration membrane is brought into contact with, or is fusion bonded to, the substrate through protrusions that are formed on at least one of an upper surface and a lower surface of the vibration membrane.

Further, the electromechanical transducer according to the present invention is characterized in that the protrusions have a height in the range of from 10 nm to 200 nm.

Furthermore, the electromechanical transducer according to the present invention is characterized in that the protrusions are arranged in a ring shape so as to surround the region in which the contact state is kept.

Moreover, a method for manufacturing an electromechanical transducer according to the present invention, in which the electromechanical transducer includes a vibration membrane provided with a first electrode, a substrate provided with a second electrode, and a support member adapted to support the vibration membrane in such a manner that a gap is formed between the vibration membrane and the substrate with these electrodes being arranged in opposition to each other, wherein a part of the vibration membrane and a region of the substrate are in contact with each other, and a remaining region of the vibration membrane other than the contact region is able to vibrate, and wherein there is an overlap region of the first electrode and second electrode in the contact region, the method comprising: a step of forming a through portion in at least one of the first and second electrodes in at least a part of the overlap region.

In addition, the method for manufacturing an electromechanical transducer according to the present invention is characterized by comprising a step of forming a structure in which the vibration membrane is caused to plastically deform in such a manner that a part of the vibration membrane is made to operate in a collapse mode while keeping a state of contact thereof with a region of the substrate including the second electrode.

Moreover, the method for manufacturing an electromechanical transducer according to the present invention is characterized by fusion bonding a part of the vibration membrane that has been plastically deformed to the region of the substrate when the structure to keep the contact state is formed.

Further, the method for manufacturing an electromechanical transducer according to the present invention is characterized by forming protrusions on at least one of an upper surface and a lower surface of the vibration membrane, wherein when the structure to keep the contact state is formed, the vibration membrane is brought into contact with, or is fusion bonded to, the substrate through the protrusions.

Furthermore, the method for manufacturing an electromechanical transducer according to the present invention is characterized in that the protrusions have a height in the range of from 10 nm to 200 nm.

In addition, the method for manufacturing an electromechanical transducer according to the present invention is characterized in that the protrusions are formed in a ring shape so as to surround the region in which the contact state is kept.

According to the present invention, it is possible to achieve an electromechanical transducer and a method for manufacturing the same in which when the transducer is made to operate in a collapse mode, voltage reduction can be made in a stable manner without reducing an electromechanical transduction efficiency and without lowering a signal detection function.

Other features and advantages of the present invention will be apparent from the following description taken in conjunction with the accompanying drawings, in which like reference characters designate the same or similar parts throughout the figures thereof.

DESCRIPTION OF EMBODIMENTS

Preferred embodiments of the present invention will now be described in detail in accordance with the accompanying drawings.

Electromechanical transducers according to the present invention are suitably used as acoustic transducers that are used in particular for transmission and reception of acoustic waves, and are further suitably used as ultrasonic transducers that are used for transmission and reception of ultrasonic waves.

The term “sound or acoustic wave” in this specification is not limited to an elastic wave transmitting in air, but is a generic name for all kinds of elastic waves that transmit through elastic bodies irrespective of their states, i.e., gas, liquid or solid. In other words, it is a broad concept even including an ultrasonic wave that is an elastic wave of frequencies exceeding human audio frequencies.

The electromechanical transducers according to the present invention can be applied, as ultrasonic probes, to ultrasonic diagnostic apparatuses (echographers) or the like. Hereafter, the present invention will be described as ultrasonic transducers (ultrasonic sensors) that transmit or receive ultrasonic waves, but it is evident that acoustic waves which can be detected are not limited to ultrasonic waves if consideration is given to the principles of the transmission and reception of the acoustic sensors of the present invention.

Reference will be made to a capacitive micromachined ultrasonic transducer (CMUT) according to preferred embodiments of the present invention.

Embodiment 1

Now, reference will be made to a capacitive micromachined ultrasonic transducer (CMUT) according to a first embodiment of the present invention.

Figure 1A:
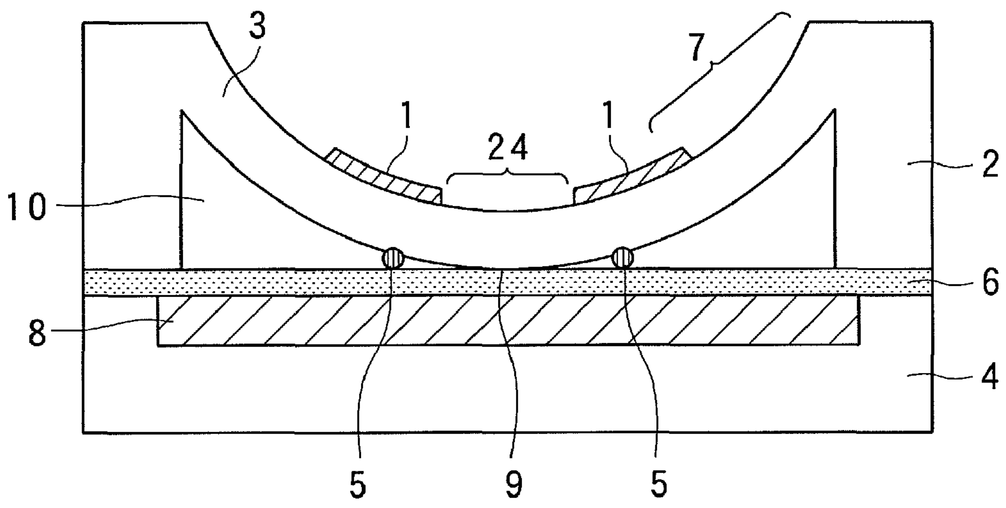
FIG. 1A is a conceptual cross sectional view illustrating a basic construction of a capacitive micromachined ultrasonic transducer (CMUT) in a first embodiment of the present invention.
Figure 1B:
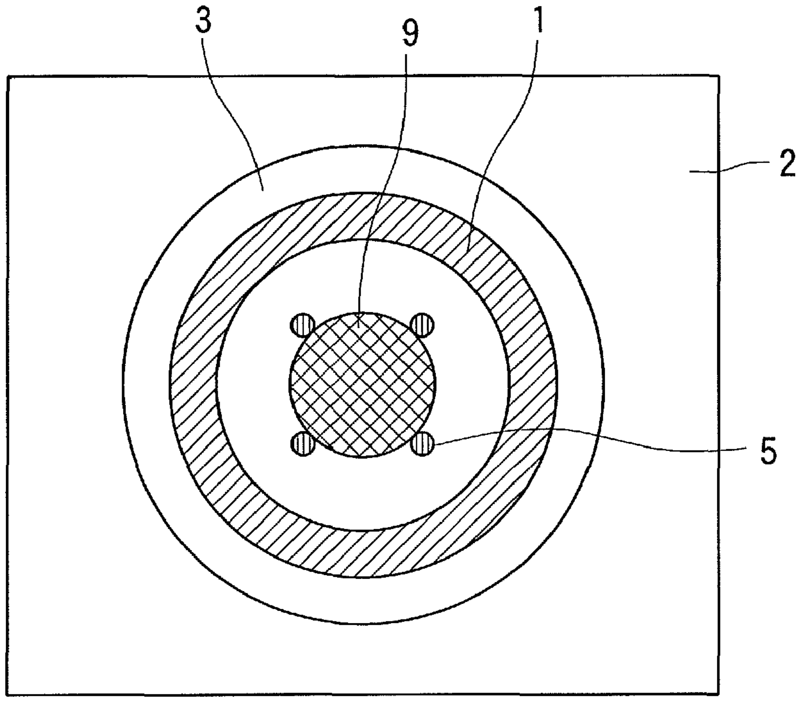
FIG. 1B is a conceptual plan view illustrating the basic construction of the CMUT in the first embodiment.

FIG. 1A and FIG. 1B are views illustrating a basic construction of a capacitive micromachined ultrasonic transducer (CMUT) in the first embodiment of the present invention. FIG. 1A is a conceptual cross sectional view of the capacitive micromachined ultrasonic transducer (CMUT), and FIG. 1B is a conceptual plan view of the capacitive micromachined ultrasonic transducer (CMUT).

In FIG. 1A and FIG. 1B, 1 designates an upper electrode which is a first electrode, 2 a vibration membrane support member, 3 a vibration membrane, 4 a substrate, 5 protrusions, 6 an insulation film, 7 an outer peripheral portion of the vibration membrane, 8 a lower electrode which is a second electrode, 9 a contact region (fusion bonded region), 10 a cavity, and 24 an electrode through portion (electrode through hole).

The CMUT of this embodiment includes, as shown in FIG. 1A, the vibration membrane 3 provided with the upper electrode 1, the substrate 4 provided with the lower electrode 8, and the vibration membrane support member 2 that serves to support the vibration membrane so as to form a gap between the vibration membrane and the substrate with these electrodes being arranged in opposition to each other. The vibration membrane 3 is able to vibrate by receiving mechanical energy, such as receiving an ultrasonic wave.

On the substrate 4, there is formed the lower electrode of a low resistance, on which is further disposed the insulation film 6. Here, the insulation film 6 plays the role of preventing the lower electrode 8 and the upper electrode 1 from being short circuited to each other. The vibration membrane support member 2, which serves to support the vibration membrane 3, is fixedly mounted on the substrate 4 through the insulation film 6. Here, note that the lower electrode 8 itself may be used as a substrate, or the vibration membrane 3 itself may be used as an upper electrode.

In this embodiment, preferably, it is constructed such that a part of the vibration membrane including the upper electrode and a region of the substrate including the lower electrode are kept in contact with each other with no external force being applied to the vibration membrane 3. In the case of the vibration membrane being "in contact with the substrate", it is to be understood that in the case of the insulation film 6 being provided, the whole including not only the substrate 4 but also even the insulation film 6 constitutes a lower substrate.

In addition, the vibration membrane 3 is constructed in such a manner that a region of the vibration membrane 3 other than that in which the state of contact is kept can vibrate upon reception or transmission of an ultrasonic wave. In that case, in order to form the region in which the state of contact with this substrate is kept, the vibration membrane 3 is deformed into a downwardly concaved shape, thereby forming the contact region 9 which is in contact with the insulation film 6. Such a downwardly concaved deformation can be formed, for instance, by plastic deformation, and the contact region 9 can serve to fusion bond the vibration membrane 3 to the insulation film 6, thereby to form a fusion bonded region.

Thus, by the formation of the contact region (fusion bonded region), there is formed the cavity 10 which is enclosed by the substrate 4, the vibration membrane 3, and the vibration membrane support member 2. As a result, a collapse mode can be achieved without applying any external force to the vibration membrane. Accordingly, driving at a low voltage is made possible. Here, the term "external force" is an external force when attention is focused on the vibration membrane 3, and it means a force acting from the outside of the vibration membrane 3. For instance, as such, there can be exemplified an electrostatic attraction, a magnetic force, etc.

Also, in this embodiment, it can be constructed such that the region in which the above-mentioned state of contact is kept is fusion bonded to the substrate through protrusions that are formed on at least one of an upper surface and a lower surface of the vibration membrane. For instance, the protrusions 5 are formed on an outer edge or periphery of the contact region (fusion bonded region) 9 prior to the formation of the contact region (fusion bonded region) 9 (see FIG. 1B), so that when the vibration membrane 3 is placed in contact with (fusion bonded to) the insulation film 6, the area of contact (fusion bonding) is controlled by means of the protrusions 5. That is, the area of contact (fusion bonding) or the shape of contact (fusion bonding) is controlled by means of these protrusions 5.

The upper electrode 1 is formed on or in at least one of the upper (front) surface, the lower (rear) surface, and the internal portion of the vibration membrane 3, or the main body of the vibration membrane 3 itself is formed by the upper electrode 1.

In addition, in the CMUT of this embodiment, the through portion is formed in at least either one of the electrodes in at least a part of an overlap region in which the above-mentioned contact state is kept to form an overlap of the upper electrode and the lower electrode. For instance, the through portion 24 is formed through the upper electrode 1 and is arranged in opposition to the lower electrode 8, whereby a capacitive electrode is formed. This through portion 24 can be formed as a through hole, and it can be formed through the lower electrode 8 instead of the upper electrode 1, or it can be formed in both the upper and lower electrodes.

By the provision of such a through portion (through hole) 24, it is possible to cause the vibration membrane to operate in the collapse mode without reducing an electromechanical transduction efficiency and without lowering a signal detection function. In other words, it is featured that in at least a part of the overlap region in which both of the electrodes form the overlap, at least one of the electrodes is not formed. As a result, no capacitor is formed in the part which does not contribute to the capacitance change, so it is possible to reduce parasitic capacitance.

As shown in a conceptual plan view of the CMUT in FIG. 1B, the vibration membrane 3 is supported by the vibration membrane support member 2 lying in an outer edge thereof. In this embodiment, the contact region (fusion bonded region) 9 is formed between the vibration membrane 3 and the substrate 4 in the central portion of the vibration membrane 3, and the area or shape of the contact region (fusion bonded region) 9 is controlled by means of the protrusions 5 that are disposed on the outer edge of the contact region (fusion bonded region) 9. Moreover, the upper electrode 1 having the through portion (through hole) 24 formed therein is arranged so as to surround the outer periphery of the contact region 9 in a ring-shaped fashion.

Embodiment 2

Next, reference will be made to a capacitive micromachined ultrasonic transducer (CMUT) according to a second embodiment of the present invention.

Figure 2:
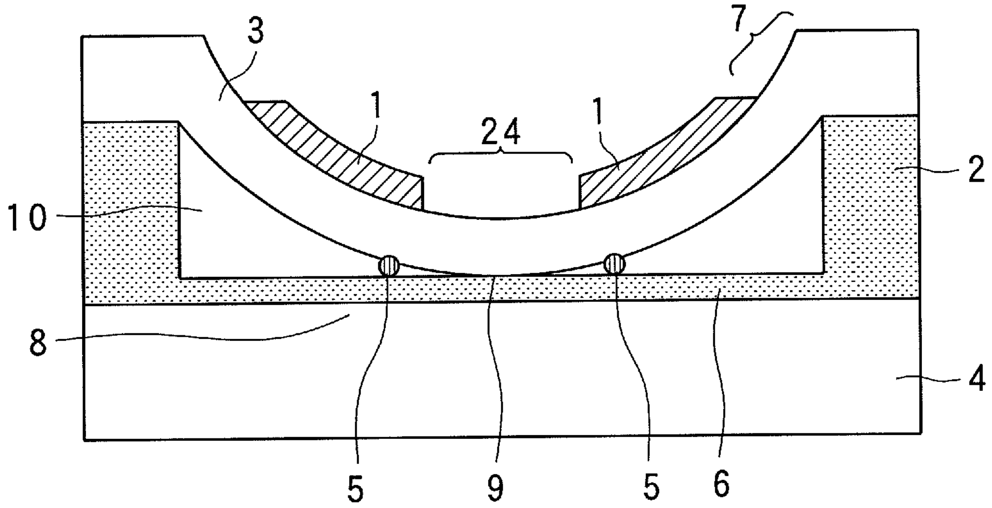
FIG. 2 is a conceptual cross sectional view illustrating a basic construction of a capacitive micromachined ultrasonic transducer (CMUT) in a second embodiment of the present invention.

FIG. 2 is a conceptual cross sectional view illustrating the basic construction of the capacitive micromachined ultrasonic transducer (CMUT) in the second embodiment of the present invention.

In this embodiment, the difference thereof from the above-mentioned first embodiment is that the substrate 4 itself is in the form of a low-resistance substrate, or the substrate 4 has a surface highly doped to form the lower electrode 8 by itself. In that case, the resistivity of the substrate 4 is preferably equal to or less than 1.0 Ω-cm, and more preferably equal to or less than 0.02 Ω-cm. The above-mentioned ranges are preferable ranges where Si can be doped in a process. That is, in case where the Si substrate itself is used as the lower electrode, it is preferred that the electrical resistance of the Si substrate be as low as possible, and if the electrical resistance is low, a potential difference due to the resistance becomes small, thus making it possible to reduce capacitance measurement errors between elements in the substrate surface.

According to the above-mentioned construction of this embodiment, the transducer can be manufactured in a simpler manner than in the first embodiment 1, and is high in the practical use, so the manufacturing processes to be described later will be explained based on this embodiment.

Embodiment 3

Now, reference will be made to a capacitive micromachined ultrasonic transducer (CMUT) in a third embodiment of the present invention which has a construction different from that of the second embodiment in the provision of a second insulation film.

Figure 3:
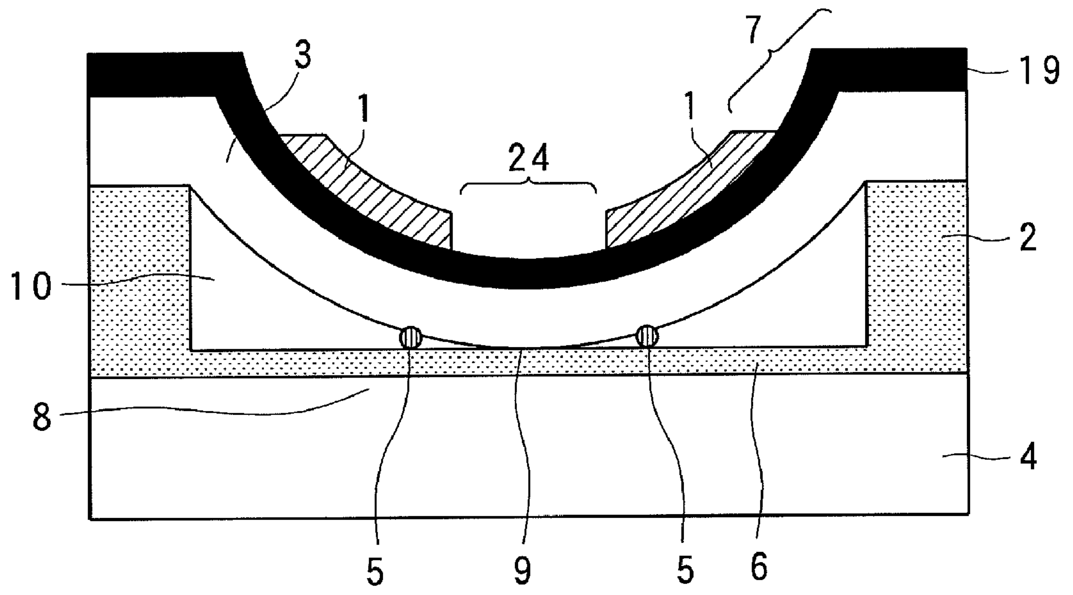
FIG. 3 is a conceptual cross sectional view illustrating a basic construction of a capacitive micromachined ultrasonic transducer (CMUT) in a third embodiment of the present invention.

FIG. 3 is a conceptual cross sectional view illustrating the basic construction of the capacitive micromachined ultrasonic transducer (CMUT) in the third embodiment of the present invention.

In this embodiment, the difference thereof from the above-mentioned second embodiment is that a second insulation film 19 is provided. By the provision of this second insulation film 19, it becomes possible to prevent the leakage of an electric current between the electrodes irrespective of the electrical conductivity of the vibration membrane 3.

In the case of forming this second insulation film 19, it is preferable to use a high permittivity material(s) such as, for example, one or more kinds of $SiO_2$, $SiN_x$, $Al_2O_3$, $Y_2O_3$, $HfO_2$, $HfSiO_x$, HfSiON, and $HfAlO_x$.

Embodiment 4

Next, reference will be made to a capacitive micromachined ultrasonic transducer (CMUT) according to a fourth embodiment of the present invention, in which the lower electrode has a through hole formed therein.

Figure 4:
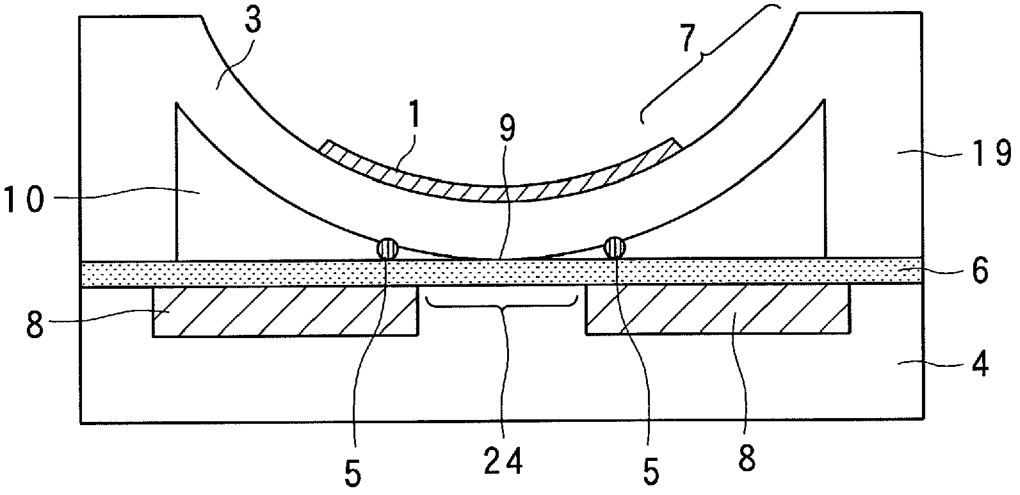
FIG. 4 is a conceptual cross sectional view illustrating the basic construction of the capacitive micromachined ultrasonic transducer (CMUT) in a fourth embodiment of the present invention.

FIG. 4 is a conceptual cross sectional view illustrating the basic construction of the capacitive micromachined ultrasonic transducer (CMUT) in the fourth embodiment of the present invention.

In this embodiment, the difference thereof from the first embodiment is that the lower electrode 8 has a through hole 24 formed therein. In forming the lower electrode with the through hole 24, there can be employed some methods, such as a method for locally doping the substrate 4, or a method for depositing a polycrystalline Si layer that has been locally doped at a high concentration, and patterning the same, or the like.

Thus, even in case where the through hole 24 is formed in the lower electrode 6, similar to the case where the through hole 24 is formed in the upper electrode 1, as in the first embodiment, it is possible to cause the vibration membrane to operate in the collapse mode without reducing an electromechanical transduction efficiency and without lowering a signal detection function. In other words, it is featured that in at least a part of the region in which both of the electrodes form an overlap, the lower electrode is not formed.

Embodiment 5

Now, reference will be made to a capacitive micromachined ultrasonic transducer (CMUT) according to a fifth embodiment of the present invention, wherein protrusions 5 are formed on an upper portion of the vibration membrane 3.

Figure 5:
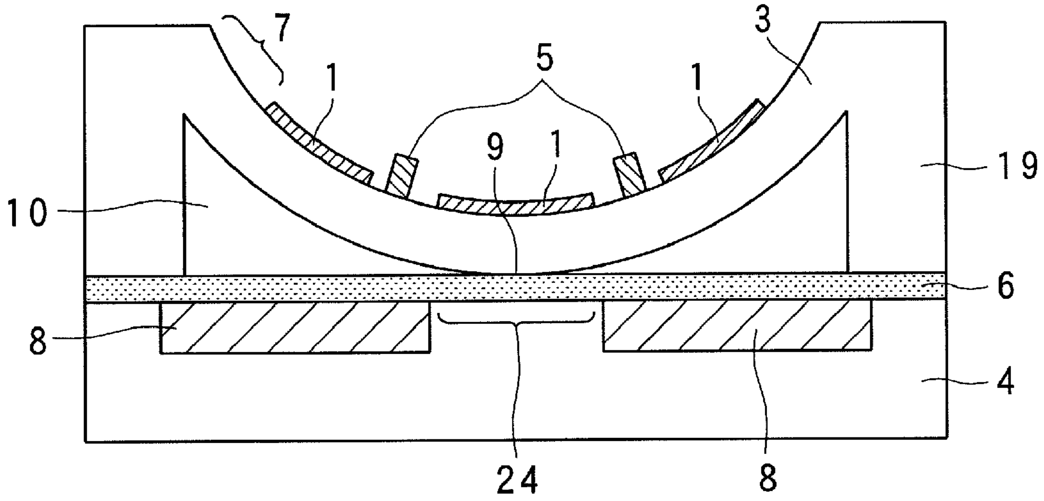
FIG. 5 is a conceptual cross sectional view illustrating a basic construction of a capacitive micromachined ultrasonic transducer (CMUT) in a fifth embodiment of the present invention.

FIG. 5 is a conceptual cross sectional view illustrating the basic construction of the capacitive micromachined ultrasonic transducer (CMUT) in this embodiment of the present invention.

In this embodiment, the difference thereof front the fourth embodiment is that the protrusions 5 are formed on the upper portion of the vibration membrane 3. According to the construction of this embodiment, it is possible to decrease alignment errors between the protrusions 5 and the lower electrode 8 and between the upper electrode 1 and the lower electrode 8. In addition, when the vibration membrane 3 is placed in contact with the lower substrate 8, a local flexural boundary condition is provided by the protrusions 5 formed on the upper portion of the vibration membrane 3.

Accordingly, when the protrusions come in contact with the lower substrate, an inner region of the vibration membrane surrounded by the protrusions can not be placed in contact with the substrate if a bending moment applied to the vibration membrane by an external force is not increased above a certain value. That is, the contact region can be controlled according to a region in which the protrusions are arranged. In that case, the arrangement region of the protrusions can be controlled in an actual process, and in addition, the area of contact can be effectively controlled by deciding a threshold for the bending moment applied to the vibration membrane.

Embodiment 6

Next, reference will be made to a capacitive micromachined ultrasonic transducer (CMUT) according to a sixth embodiment of the present invention, wherein protrusions 5 are formed on an upper portion of the vibration membrane 3.

Figure 6:
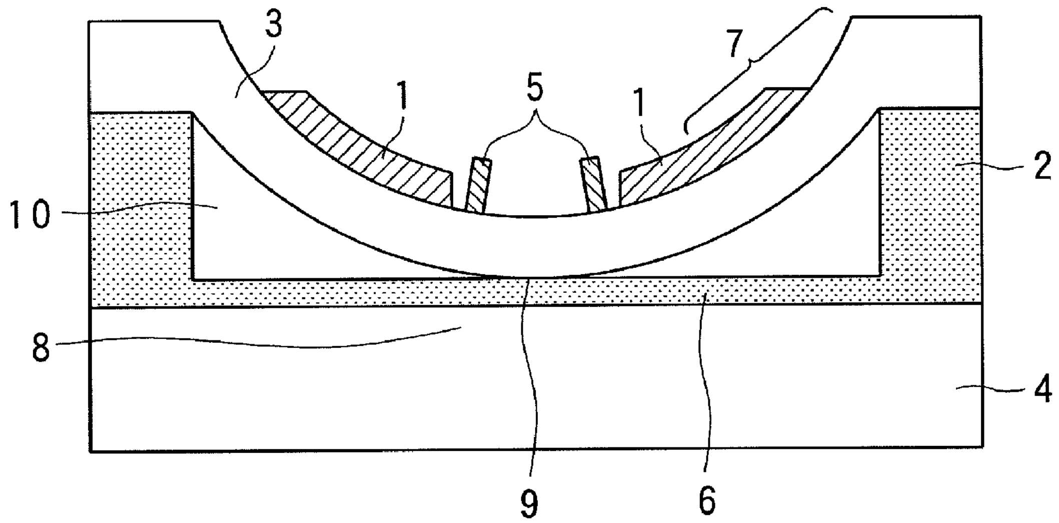
FIG. 6 is a conceptual, cross sectional view illustrating a basic construction of a capacitive micromachined ultrasonic transducer (CMUT) in a sixth embodiment of the present invention.

FIG. 6 is a conceptual cross sectional view illustrating the basic construction of the capacitive micromachined ultrasonic transducer (CMUT) in the sixth embodiment of the present invention.

In this embodiment, the difference thereof from the second embodiment is that protrusions 5 are formed on an upper portion of the vibration membrane 3. According to this embodiment, it is possible to decrease alignment errors between the protrusions 5 and the lower electrode 8 and between the upper electrode 1 and the lower electrode 8.

Embodiment 7

Now, reference will be made to a capacitive micromachined ultrasonic transducer (CMUT) according to a seventh embodiment of the present invention, wherein in a form of construction in which a second insulation film is provided, protrusions 5 are formed on an upper portion of the vibration membrane 1.

Figure 7:
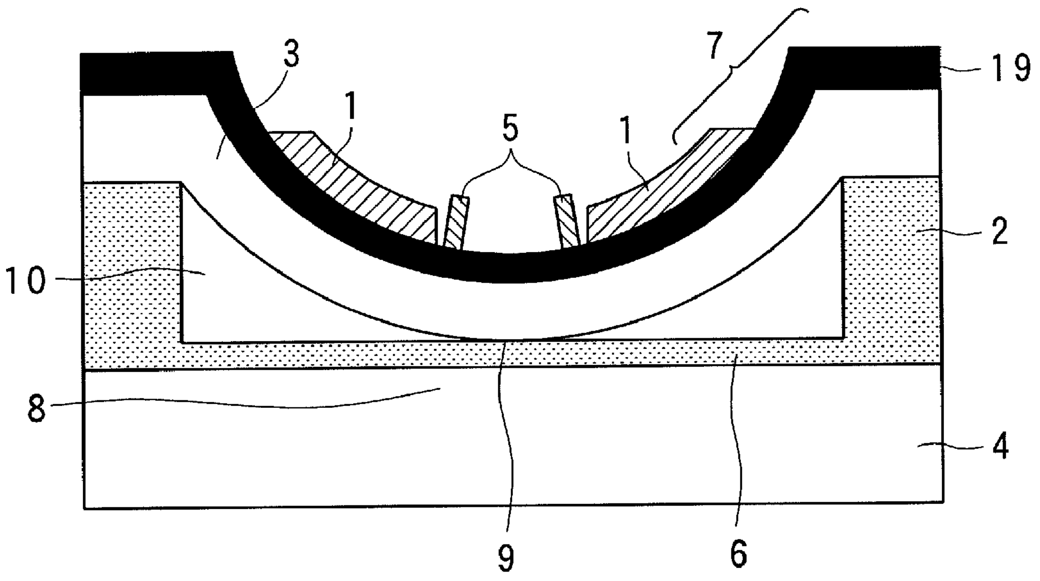
FIG. 7 is a conceptual cross sectional view illustrating a basic construction of a capacitive micromachined ultrasonic transducer (CMUT) in a seventh embodiment of the present invention.

FIG. 7 is a conceptual cross sectional view illustrating the basic construction of the capacitive micromachined ultrasonic transducer (CMUT) in this embodiment.

In this embodiment, the difference thereof from the third embodiment is that in the form of construction having the second insulation film, the protrusions 5 are formed on the upper portion of the vibration membrane 3. According to this embodiment, it is possible to decrease alignment errors between the protrusions 5 and the lower electrode 8 and between the upper electrode 1 and the lower electrode 6.

Embodiment 8

Next, reference will be made to a capacitive micromachined ultrasonic transducer (CMUT) according to an embodiment 8 of the present invention.

FIG. 8A through FIG. 8M are views illustrating the manufacturing processes or steps for the capacitive micromachined ultrasonic transducer (CMUT) in this embodiment of the present invention.

In order to make the following explanation concise, a "patterning process" herein is assumed to include various processes ranging from the processes of photolithography, such as applying a photoresist on the substrate, drying, exposing, developing the photoresist, etc., to other processes such as an etching process, a process of removing the photoresist, a process of washing the substrate, a process of drying the substrate, and so on.

In the following, reference will be made to a process or step of forming a structure in which the vibration membrane is caused to plastically deform in such a manner that it is caused to operate in a collapse mode with a part of the vibration, membrane being kept in contact with a region of the substrate including the lower electrode.

Figure 8A:
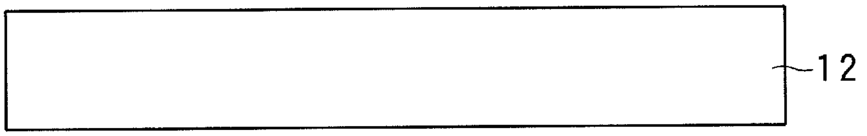
FIG. 8A through FIG. 8M are views illustrating the production processes or steps for the capacitive micromachined ultrasonic transducer (CMUT) in an eighth embodiment of the present invention.

In the manufacturing processes of this embodiment, a Si substrate 12 is first washed and prepared, as shown in FIG. 8A.

Figure 8B:
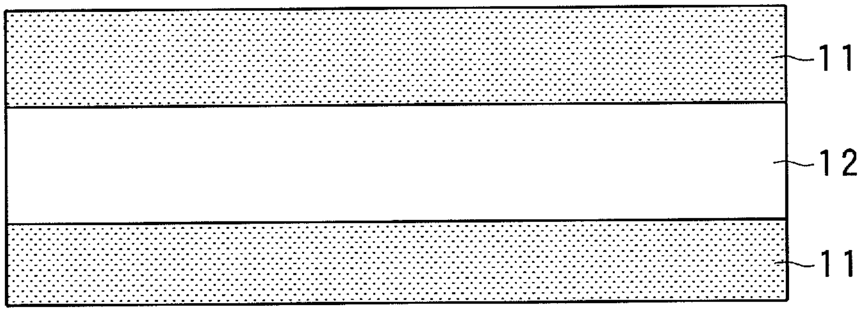

Then, the Si substrate 12 is put into a thermal oxidation furnace so that a Si oxide film 11 is formed therein, as shown in FIG. 8B. Preferably, the thickness of this Si oxide film is in the range of from 10 nm to 4,000 nm, more preferably in the range of from 20 nm to 3,000 nm, and most preferably in the range of from 30 nm to 2,000 nm. A rough or approximate distance between the electrodes is decided according to the above-mentioned thermal oxidation process. If in the above ranges, the thickness is in a feasible or allowable range in actual processes, and a reasonable electric field can be obtained.

Figure 8C:
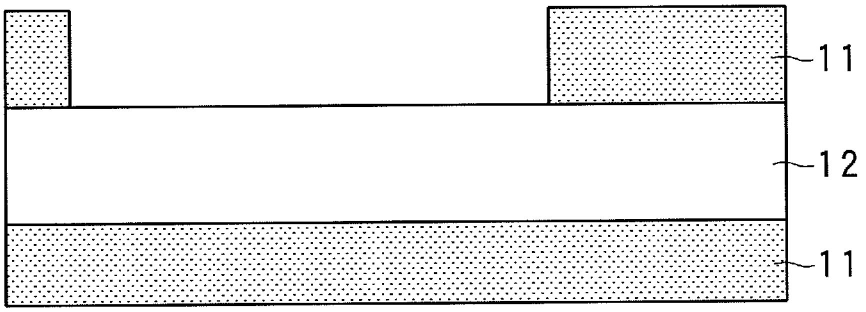

Subsequently, the Si oxide film 11 is subjected to patterning, as shown in FIG. 8C.

Figure 8D:
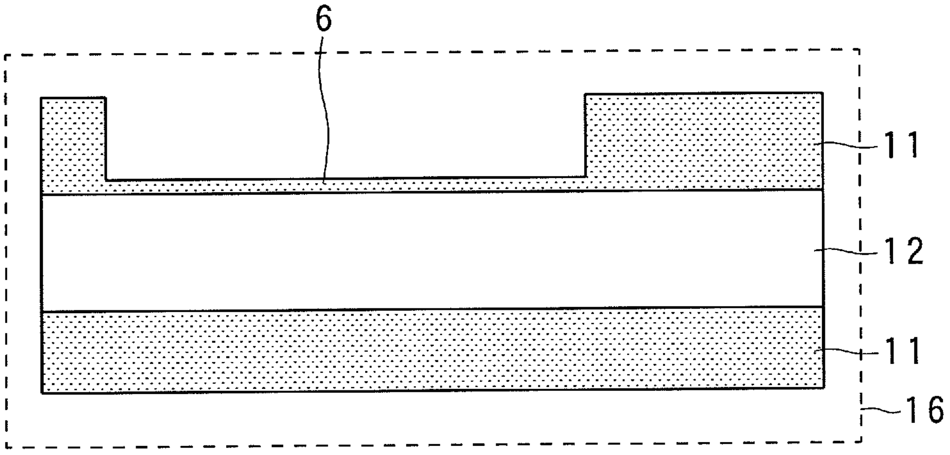

Thereafter, a second thermal oxidation process is performed to form an insulation film 6 in the form of a thin thermal oxide film, as shown in FIG. 8D. Preferably, the thickness of the insulation film 6 is in the range of from 1 nm to 500 nm, more preferably in the range of from 5 nm to 300 nm, and most preferably in the range of from 10 nm to 200 nm. The insulation film for preventing electrical discharge is decided according to the above-mentioned thermal oxidation process. If the insulation film is too thin, there is obtained no effect of preventing electrical discharge, whereas when it is too thick, the distance between the electrodes becomes too large. The above-mentioned ranges of the film thickness of the thermal oxide-film insulation film are actually feasible or allowable in actual processes, whereby a reasonable effect of preventing electrical discharge can be obtained. In order to make the following explanation concise, the substrate that has been completed in the processes up to the one in FIG. 8D is called an A substrate 16.

Figure 8E:
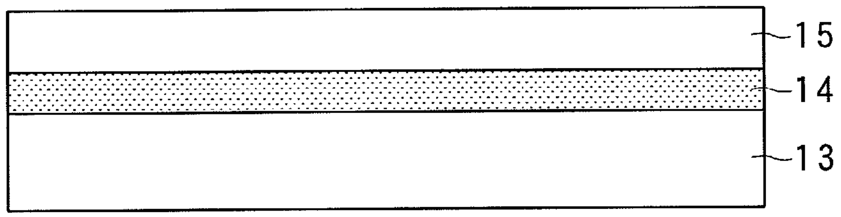

Then, one SOI (Silicon On Insulator) substrate that has been washed is prepared, as shown in FIG. 8E. Preferably, the thickness of a device layer 15 of this SOI substrate is in the range of from 10 nm to 5,000 nm, more preferably in the range of from 20 nm to 3,000 nm, and most preferably in the range of from 30 nm to 1,000 nm. The above-mentioned ranges of thickness of the device layer 15 can be achieved in the processes. Here, it is known that the square of an oscillation frequency is directly proportional to the ratio of spring rigidity to effective mass of the vibration membrane. A spring rigidity and an effective mass are required which correspond to the oscillation frequency at which an ultrasonic wave can be emitted. The spring rigidity and the effective mass of the vibration membrane are both functions of the film thickness of the vibration membrane. The above-mentioned ranges of the film thickness in the device layer 15 are those which can provide an appropriate spring rigidity and an appropriate effective mass as the vibration membrane of the CMUT in this embodiment.

Preferably, the thickness of a BOX (Buried Oxide) layer 14 of the above-mentioned 501 substrate is in the range of from 100 nm to 3,000 nm, and more preferably, in the range of from 200 to 1,000 nm. The above BOX layer is used as an etching stop layer which is to be described later. When considered from the internal, stress of the oxide film, the selectivity of etching, the convenience of operation in actual processes, and so on, the above-mentioned film thickness of the BOX layer is in an appropriate range.

Figure 8F:
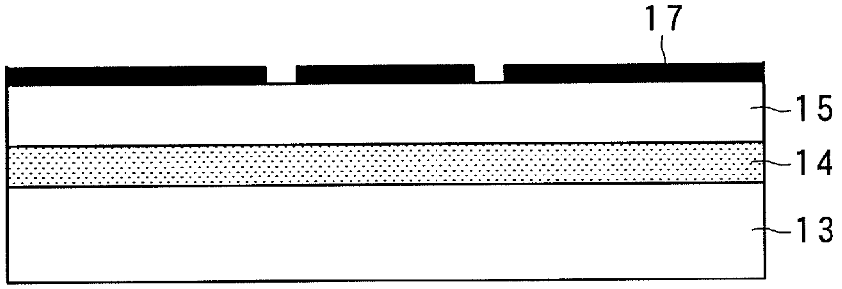

Subsequently, as shown in FIG. 8F, a SiN layer 17 is deposited on the device layer 15 according to an LPCVD (Low Pressure Chemical Vapor Deposition) method, and is subjected to patterning.

As shown in FIG. 1B, the shape into which the above-mentioned SiN layer 17 is patterned is formed of a plurality of circular holes, and these holes are distributed or arranged in a substantially ring shape. It is preferred that the diameter of each of the circular holes be in the range of from 10 nm to 3,000 nm. The above range of the circular hole diameter is actually feasible or allowable in actual processes. A process with a circular hole diameter below (smaller than) this range is very difficult. If circular holes of diameters beyond (larger than this range are formed, protrusions of almost the same shapes as those of the circular holes are then formed, so the larger the protrusions, the more influence is exerted on the mass of the vibration membrane, thus reducing the accuracy of the process.

Figure 8G:
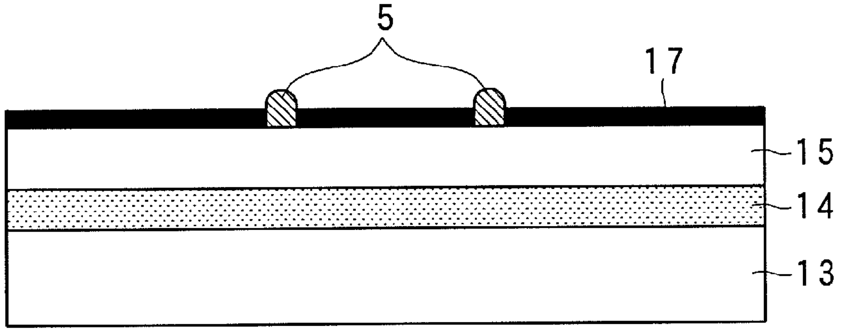

Thereafter, the substrate with the above-mentioned SiN layer is thermally oxidized. As shown in FIG. 8G, a part of the device layer 15 of the SOI substrate exposed from the SiN layer 17 is selectively oxidized, whereby the protrusions 5 are formed. A LOCOS (Local Oxidation of Silicon) process, which is a semiconductor process, is generally used for the above selective oxidation process.

Therefore, a lot of circular holes are formed through that portion of the device layer 15 which is exposed from the SiN layer 17, and are distributed or arranged in a substantially ring shape. Thus, the protrusions 5 similarly have a granular structure including a lot of substantially hemispheres, and are distributed or arranged in a substantially ring shape. Preferably, the height of the protrusions is in the range of from 1 nm to 1,000 nm, more preferably in the range of from 5 nm to 500 nm, and most preferably in the range of from 10 nm to 200 nm.

When the vibration membrane is placed in contact with the lower substrate, as will be described later, a local flexural boundary condition is provided by the above-mentioned height of the protrusions. Accordingly, when the protrusions come in contact with the lower substrate, it is not possible for the vibration membrane to be placed in contact with the lower substrate while going beyond the protrusions if a bending moment applied to the vibration membrane by an external force is not increased above a certain value.

That is, the contact region can be controlled according to the height of the protrusions. In that case, the range of the height of the protrusions can be controlled in an actual process. In addition, the area of contact can be effectively controlled by deciding a threshold for the bending moment applied to the vibration membrane.

Here, note that when the external, force is applied to the vibration membrane thereby to place the vibration membrane in contact with the protrusions, the protrusions are forced to form gaps. In addition, in order to make, upon application of the external force, the outer peripheral portion of the vibration membrane (regions of the vibration membrane between the protrusions and the support member) to be collapsed or crushed, the external force to be applied should be much greater than that required in the case of no protrusions, and if otherwise, the outer peripheral portion of the vibration membrane is not pressed into a collapsed or crushed state.

Here, note that the distribution or arrangement shape of the protrusions 5 may be a substantially ring shape or a substantially polygonal shape. In addition, in the absence of the protrusions 5, the area control of the contact region 9 can be made by other methods, too. For instance, the protrusions 5 may not be provided if a balance between the cavity 10 and external, pressure is controlled in a precise manner.

Here, note that the following materials for the protrusions are suitable in relation to the following fusion bonding process. For the materials for the protrusions 5, there can be used at least one of an oxide film, a nitride film, an oxynitride film of Si, Ge, GaAs and so on, or at least one of Cu, W, Sn, Sb, Cd, Mg, In, Al, Cr, Ti, Au and Pt. In addition, combinations of the above materials, for instance, a multilayered structure, can be used.

Figure 8H:
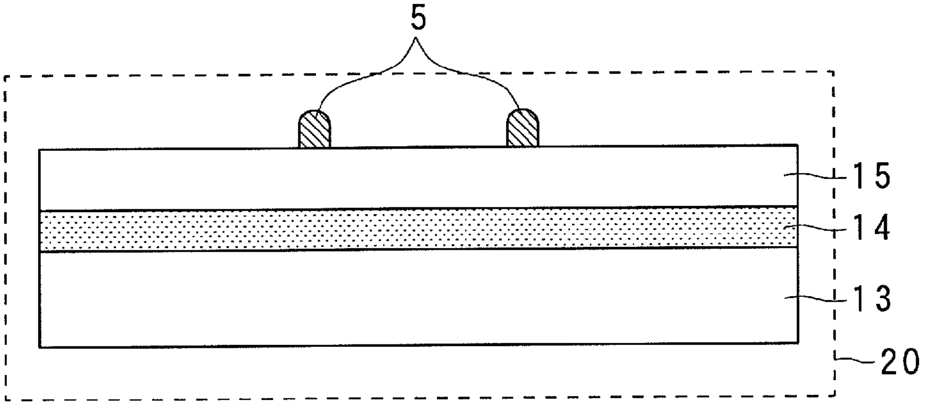

Next, as shown in FIG. 8H, the SiN layer 17 is etched and removed by the use of a heated liquid containing phosphoric acid. In order to make the following explanation concise, a substrate that has been completed in this manner is called a B substrate 20.

Figure 8I:
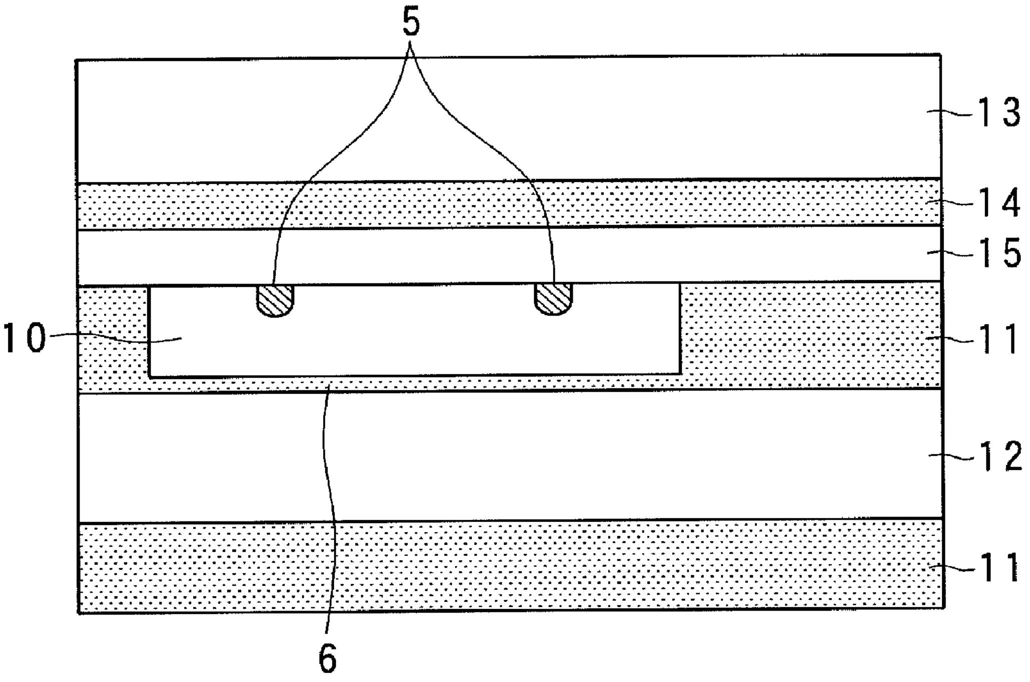

Then, as shown in FIG. 8I, the rear and the front of the B substrate 20 are reversed, placed on and joined or bonded to the A substrate 16 in alignment, therewith, whereby the cavity 10 is formed therebetween.

An environmental pressure condition in the above bonding process may be one atmospheric pressure, but it is desirable to perform the bonding in vacuum. In case where the bonding is performed in vacuum, the pressure is preferably equal to or less than $10^4$ Pa, more preferably equal to or less than $10^2$ Pa, and most preferably equal to or less than 1 Pa. The higher the degree of vacuum, the lower the moisture is, and the smaller the degassing is in the subsequent processes, thus leading to a high yield. The above ranges of the degree of vacuum can permit the use of an ordinary vacuum bonding apparatus, and can provide a reasonable convenience of process operation.

Here, note that the temperature in the above bonding process is preferably in the range of from room temperature to 1,200 degrees C., more preferably from 80 degrees C. to 1,000 degrees C., and most preferably from 150 degrees C. to 800 degrees C. The higher the temperature of the bonding, the lower the subsequent degassing is, and the higher the strength of the bonding becomes, so higher bonding temperatures are more desirable. However, the stress due to the bonding remains, so unfavorable influences might be given to the vibration membrane. The above bonding temperature ranges can provide an appropriate bonding strength and a stable vibration membrane internal stress.

Thereafter, LPCVD SiN films are deposited, over the entire surfaces of the substrates thus bonded, and an LPCVD SiN film on the B substrate side is removed by means of dry etching.

Subsequently, a handling layer 13 is wet etched with a heated alkaline liquid with the use of a single-sided etching jig. The alkaline liquid is very high in the etching selection ratio of Si to SiO (in the range of from about 100 to 10,000), so the wet etching removes the handling layer 13, and stops at the BOX layer 14.

Figure 8J:
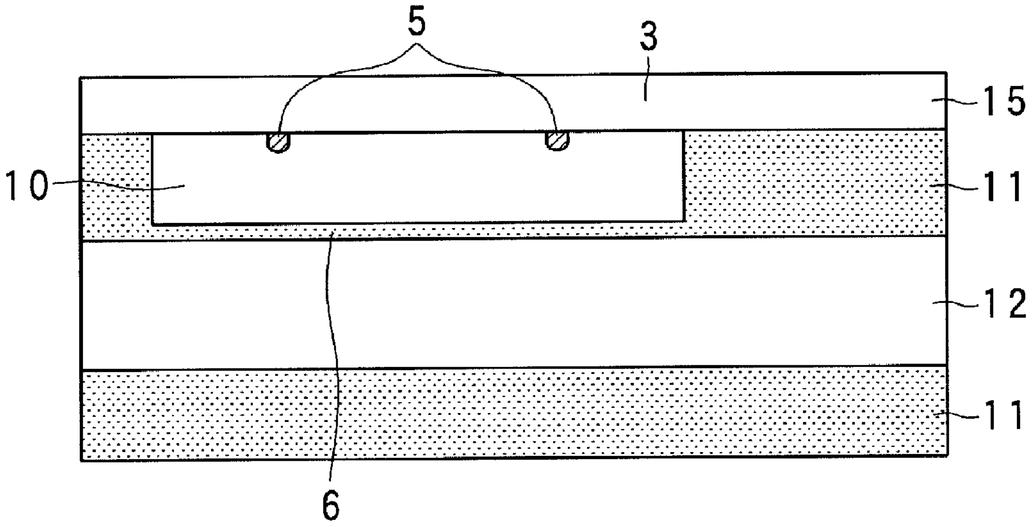

Then, as shown in FIG. 8J, in the BOX layer 14 is etched and removed by using a liquid containing hydrofluoric acid.

Here, note that when the vacuum bonding is performed, the device layer 15 of the B substrate is deformed downwardly into a concave shape under the action of atmospheric pressure. That is, the device layer 15 becomes a concave state without application of external forces other than atmospheric pressure, so it can serve as the vibration membrane 3 of the ultrasonic transducer of this embodiment. However, the embodiment is not limited to this, and the vibration membrane 3 can be further deformed downwardly by designing the thickness of the oxide film 11 and the size of the vibration membrane 3 in an appropriate manner, and by applying an appropriate external pressure.

Figure 8K:
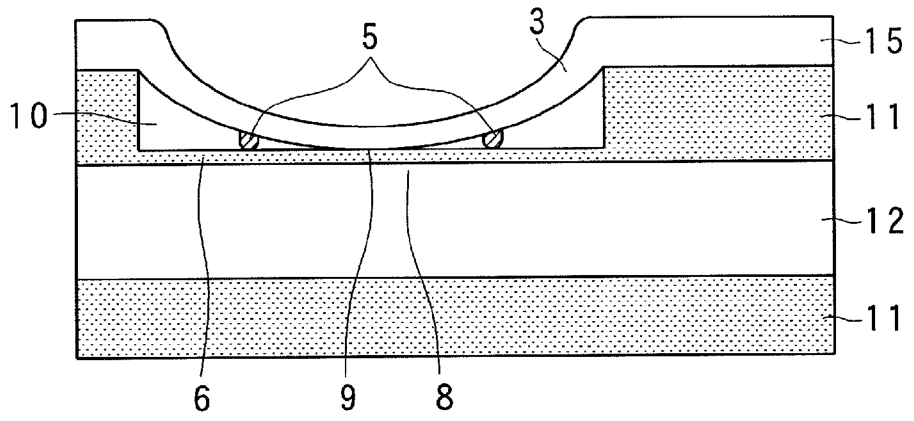

Thus, by performing the above-mentioned appropriate dimensional design, and by deciding the external pressure condition and applying an external pressure based thereon, the central portion of the vibration membrane 3 is brought into contact with the oxide film 11, whereby the contact region 9 can be formed, as shown in FIG. 8K. That is, it is possible to form a shape that can be operated in the above-mentioned collapse mode. In ordinary practice, the center of the vibration membrane 3 is a maximum point or location of displacement, so the contact region 9 is formed into a substantially concentric circular shape from the center of the vibration membrane 3.

Moreover, because the variation of the shape in the contact region 9 is large when such a transducer is mass-produced, it is effective, in forming transducers into an array, to adopt a structure in which the above-mentioned protrusions 5 are arranged to surround the contact region.

Thereafter, this substrate is heated to plastically deform the vibration membrane 3 while forming the contact region 9 according to the above-mentioned appropriate dimensional design and the external pressure condition. In case where the vibration membrane 3 is made of Si, the heating temperature capable of plastically deforming the vibration membrane is preferably in the range of from 600 degree C. to 1,500 degrees C., more preferably in the range of from 650 degrees C. to 1,400 degrees C., and most preferably in the range of from 700 degrees C. to 1,300 degrees C. The thin Si film in the form of the vibration membrane 3, when once plastically deformed at high temperature, remains in the collapsed or crushed shape even if its temperature has returned to room temperature, and the shape of the vibration membrane does not restore to its original shape before the plastic deformation.

A plastic phenomenon will occur in Si when its temperature rises to a predetermined temperature or above. Thus, by heating the vibration membrane which is in contact with the substrate, the vibration membrane can keep its collapse mode even when its temperature returns to room temperature. In this case, no external force is required for keeping the collapse mode.

Further, a Si surface and a Si oxide membrane surface at opposite sides of the contact region 9 form chemical bonding in the above-mentioned high temperature range, so that they are bonded or fusion bonded to each other. In that case, the higher the temperature, or the longer the time of contact therebetween, the stronger the strength of the chemical bonding becomes.

In this embodiment, the strength of the chemical bonding is preferably in the range of from 1 MPa to 22 MPa, more preferably in the range of from 2 MPa to 21 MPa, and most preferably in the range of from 3 MPa to 20 MPa.

Here, note that the plastic deformation of the internal Si of the vibration membrane 3 is a function of temperature, crystalline dislocation density, and strain rate.

In addition, in this embodiment, the crystalline dislocation density is preferably equal to or less than $10^5/cm^2$, more preferably equal to or less than $10^4/cm^2$, and most preferably equal to or less than $10^3/cm^2$. The plastic deformation characteristic of Si depends on an internal initial dislocation density of Si. In case where there is no initial dislocation density, i.e., in the case of substantially perfect single crystal. Si and at a temperature of 800 degrees C. or above, plastic deformation starts at the instant when an external stress of about 100 MPa is applied. The stress at which such plastic deformation starts is called a plastic deformation starting stress. The more the Si internal initial dislocation density, the smaller the plastic displacement starting stress becomes. In case of $10^6/cm^2$, the plastic deformation starting stress is about 35 MPa, and is the same value as the above-mentioned flow stress, so the starting point of the plastic deformation becomes difficult to be observed. Here, note that an external, pressure is sometimes applied so as to plastically deform the internal Si of the vibration membrane 3.

Moreover, in this embodiment, the Si internal stress generated by the external pressure is preferably in the range of from 10 MPa to 110 MPa, more preferably in the range of from 20 MPa to 110 MPa, and most preferably in the range of from 30 MPa to 90 MPa. This Si internal stress generated by the external pressure is the same meaning as the above-mentioned plastic deformation starting stress or the same reason as that for the above-mentioned dislocation density, in order to possibly make the plastic deformation starting point easy to observe, it is desirable to provide a certain plastic deformation starting stress. Therefore, in the case of a temperature of about 300 degrees C., it is preferable that the plastic deformation starting stress be between 100 MPa (substantially perfect single crystal Si) and 35 MPa (flow stress).

Figure 8L:
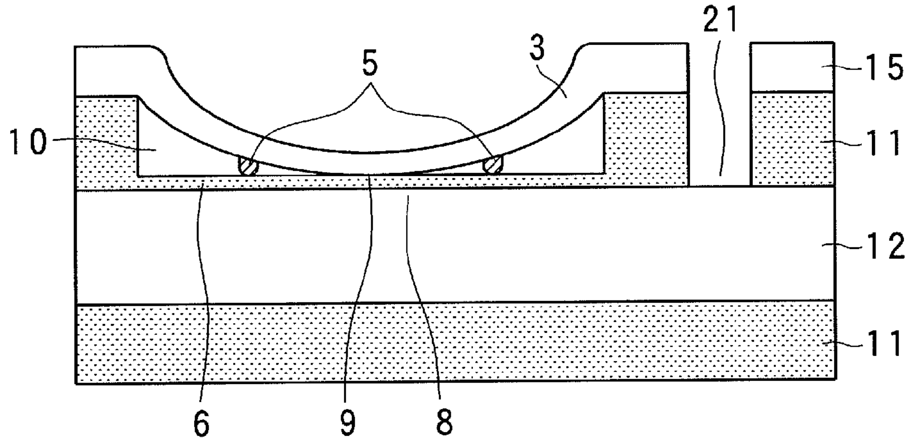

Then, the device layer 15 forming the vibration membrane 3 is patterned near the outer edge of the vibration membrane 3 by means of dry etching. The oxide film 11 is directly patterned by means of wet etching without removing a photoresist for the patterning of the device layer 15. An etching hole 21 is formed according to the above-mentioned process, as shown in FIG. 8L.

Figure 8M:
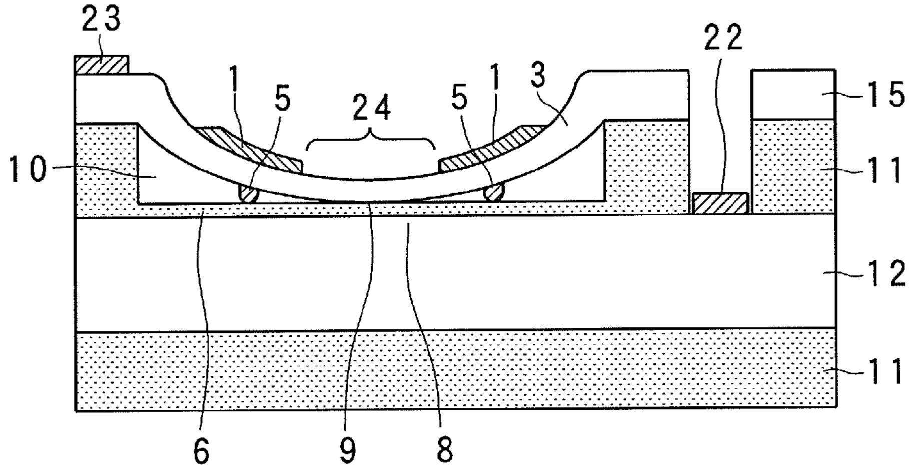

Subsequently, a metal film for electrodes is deposited and patterned to form the upper electrode 1, an upper electrode pad 23 and a lower electrode pad 22, as shown in FIG. 8M. By this patterning, an electrode through opening 25 is formed as a through portion.

Finally, in order to electrically separate or isolate multi-elements in this embodiment, the device layer 15 is patterned to, complete an element array. However, a figure for such electrical separation is omitted. For the metal film, al least one is selected and used from the group comprising Al, Cr, Ti, Au, Pt, Cu, etc. Here, note that in the case of an ordinary ultrasonic transducer, the flexure of the vibration membrane 3 is equal to or less than several hundreds nm, and the size of the transducer (e.g., the diameter of the vibration membrane 3) is in the range of from several tens micrometers to several hundreds micrometers. Therefore, in an exposure process in the patterning process of the metal film, exposure shifts or variations such as optical diffractions can be corrected with the use of an ordinary photolithography or exposure machine.

In FIG. 8M, there is shown an optimal basic form of capacitive micromachined ultrasonic transducer according to this embodiment, wherein the lower electrode 8 is composed of a main body of the Si substrate 12. In case where this substrate main body is used as the electrode, the sheet electrical resistance of the Si substrate 12, which forms the lower electrode 8, is preferably equal to or less than 1.0 Ω/sq, more preferably equal to or less than 0.1 Ω/sq, and most preferably equal to or less than 0.02 Ω/sq.

In addition, in FIG. 2, the substrate 4 itself is shown as the lower electrode, but the region of the lower electrode 8 is not shown. Also, in case where the Si substrate 12 is not used as the lower electrode, the lower electrode 8 having high electrical, conductivity can be embedded or incorporated in the substrate 4, as shown in FIG. 1A, FIG. 4, or FIG. 5. Moreover, the resistivity of the vibration membrane 3 is preferably equal to or higher than 100 Ω-cm, more preferably equal to or higher than 1,000Ω-cm, and most preferably equal to or higher than 10,000Ω-cm. In this regard, in case where the vibration membrane 3 is made of Si having low electrical resistance, the vibration membrane itself can be used as the upper electrode, and it is not essential to arrange a metal electrode right above the vibration membrane.

As shown in FIG. 3 or FIG. 7, another or second insulation film can be provided on the vibration membrane 3 of low resistance. In this second insulation film, for instance, at least one of dielectric materials such as a SiN film, a SiO film, a SiNO film, $Y_2O_3$, HfO, HfAlO and so on can be provided, and in addition, the upper electrode can be arranged on this second insulation film. On the other hand, in the case of the vibration membrane 3 being made of an insulating material, the insulation film 6 made of a material of high permittivity such as, for example, a SiN film may be omitted. In this case, it is essential to arrange the upper electrode on the vibration membrane.

In the manufacture of the CMUT of this embodiment, other MEMS (MicroElectroMechanical Systems) technologies can be used. For instance, a well-known SM method (Surface Micromachining method; a method of removing a sacrificial layer to form a cavity), etc., can be used. Although in the foregoing description, reference has been made to the manufacture using a bonding technique, it is also possible to manufacture the capacitive micromachined ultrasonic transducer of this embodiment by using other EMS technologies.

In addition, the cross sectional view of FIG. 8M shows the optimal basic form in this embodiment. To make the figure concise, a passivation layer for electrical wiring or the electrical wiring for the upper electrode 1 and the upper electrode pad 23 or the like to be formed thereon are not shown in the figure.

According to this embodiment, when the vibration membrane is caused to operate in a collapse mode, a part of the vibration membrane can be kept in contact with the substrate without any external force being applied thereto, so it becomes possible to reduce the required voltage in a stable manner. In addition, for the purpose of keeping the vibration membrane in contact with the substrate, there is no need for a fixing material such as resin, resist or the like. Accordingly, there is no influence from such a fixing material, so the variation of vibration is limited, thus making it possible to achieve the CMUT that is subjected to little or no change with the lapse of time or the like.

In addition, according to this embodiment, the plastically deformed vibration membrane contacts with or is fusion bonded to the underlayer substrate. Therefore, it is possible to greatly-decrease a DC voltage, whereby discharge breakdown of the insulation film can be reduced.

In addition, according to this embodiment of the present invention, by forming the through hole in the upper electrode, parasitic capacitance can be decreased to increase a variable capacitance ratio (active ratio) between the lower electrodes, thereby making it possible to achieve an ultrasonic transducer (CMUT) of high performance with a high electromechanical transduction efficiency.

In addition, according to this embodiment, by the provision of the protrusions, it is possible to control the contact area between the vibration membrane and the underlayer substrate, whereby the dynamic range, bandwidth and so on can be increased. Also, the variation in the manufacturing processes in the manufacture of the CMUT can be decreased, thus making it easy to perform arraying due to the stable processes. Moreover, according to the capacitive micromachined ultrasonic transducer (CMUT) of this embodiment, it becomes possible to suppress unfavorable electrical, influences on human bodies in medical diagnostics as much as possible.

Practical Example

Hereinunder, a practical example of the present invention will be described.

Figure 9A:
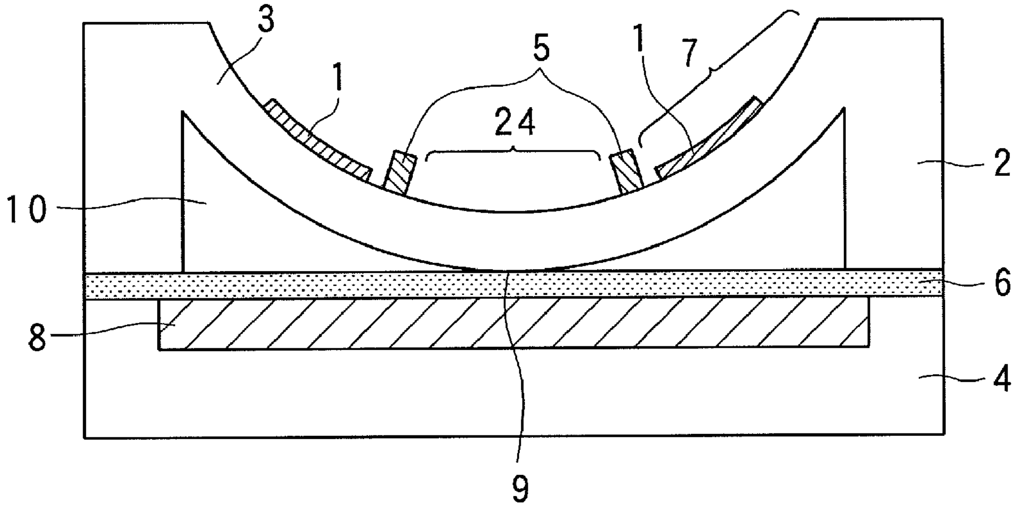
FIG. 9A is a conceptual cross sectional view illustrating a basic construction of a capacitive micromachined ultrasonic transducer (CMUT) in a practical example of the present invention.
Figure 9B:
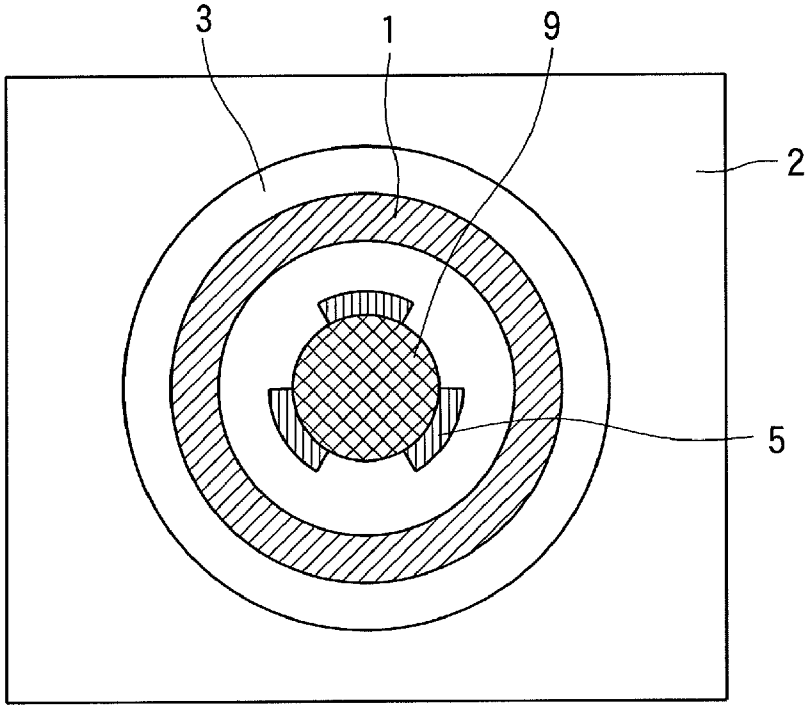
FIG. 9B is a conceptual plan view illustrating the basic construction of the capacitive micromachined ultrasonic transducer (CMUT).

FIG. 9A and FIG. 9B are views illustrating the basic construction of a capacitive micromachined ultrasonic transducer (CMUT) in this practical example. FIG. 9A is a cross sectional plan view of the capacitive micromachined ultrasonic transducer (CMUT), and FIG. 9B is a conceptual plan view thereof.

In the CMUT of this practical example, the difference thereof from the CMUT in the embodiment of the present invention as shown in FIG. 1A and FIG. 1B is that protrusions 5 are formed on an upper portion of a vibration membrane 3 so as to be distributed in a substantially ring-shaped manner, and that a lower electrode 8 is embedded or incorporated in an underlayer substrate. In this practical example, an electrode through hole 24 is formed in an upper electrode 1. Because a basically different construction is only the above-mentioned construction, those components of this practical example which correspond to those of the construction of the CMUT in the embodiment of the present invention as shown in FIG. 1A and FIG. 1B are identified by the common symbols, and the explanation of the overlapping parts is omitted.

FIG. 13A through FIG. 13C show the electrical capacitance characteristics of the capacitive micromachined ultrasonic transducer (CMUT) element of the practical example according to the present invention. FIG. 13A is a cross sectional view explaining a capacitance analysis in the CMUT element of this practical example. In FIG. 13A, the protrusions are not shown, but the radius Rc of a contact region is set to 2 micrometers.

By fixing the area of the upper electrode 1 and the contact region as a prerequisite, the changes of the capacitance and the variable capacitance ratio (active ratio) are calculated in accordance with the change of the radius Rin of the through hole 24 in the upper electrode 1. The area of a circular electrode having a radius of 5 micrometers is taken as a reference for the above-mentioned upper electrode, and the area of a circular electrode having a radius of 2 micrometers is taken as a reference for the contact region.

Table 1 below shows detailed items and numerical values for computation.

TABLE 1

| Items | Numerical values |
|---|---|
| Cavity raduis Ro | 10 μm |
| Cavity height ho | 0.2 μm |
| Vibration membrane Si thickness | 0.34 μm |
| Si permittivity | 11.7 |
| Insulation film SiO thickness | 0.15 μm |
| SiO permittivity | 3.9 |

TABLE 1-continued

| Items | Numerical values |
|---|---|
| Second insulation film SiN thickness | 0.1 μm |
| SiN permittivity | 8 |
| Upper electrode 1 area | 78.5 $\mu m^2$ |
| Contact region radius Rc | 2 μm |

Figure 10A:
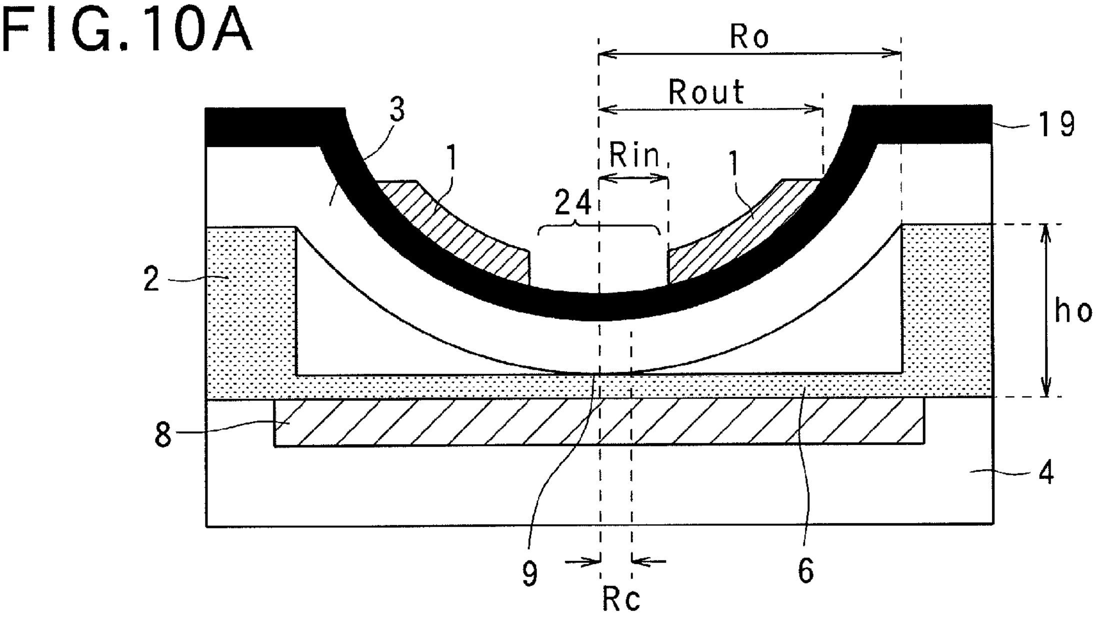
FIG. 10A is a view illustrating the electrical capacitance characteristic of the capacitive micromachined ultrasonic transducer (CMUT) in the practical example of the present invention.
Figure 10B:
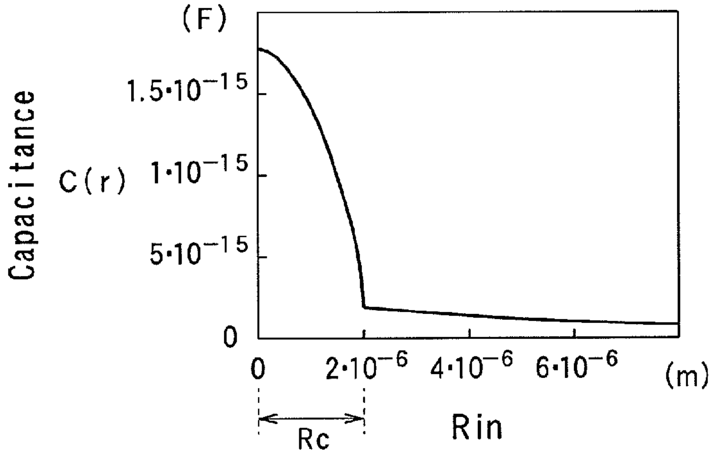
FIG. 10B is a view illustrating the dependency of electrical capacitance vs electrode through-hole internal diameter of a CMUT element.

FIG. 10B is a view illustrating the dependency of electrical capacitance vs electrode through-hole internal diameter of the CMUT element in the practical example. It has been found that the capacitance of the CMUT element dramatically decreases when the radius Rin of the through hole becomes larger than the radius Rc of the contact region. For instance, the capacitance at a through-hole radius of 4 micrometers is about 1/13 of the capacitance at a through-hole radius of 0 micrometers.

Figure 10C:
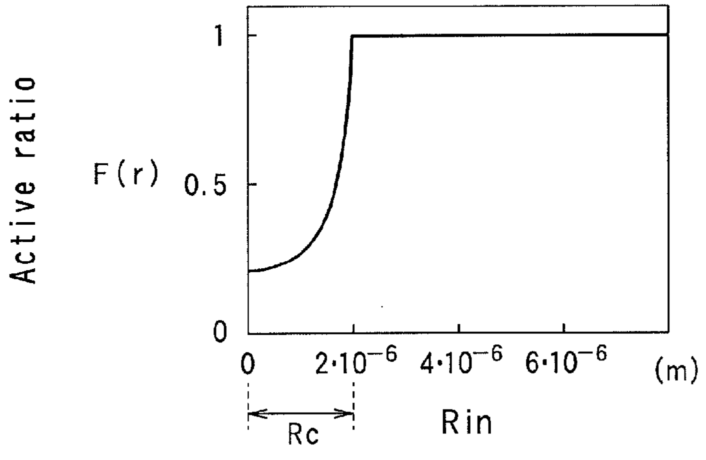
FIG. 10C is a view illustrating the dependency of variable capacitance ratio (active ratio) vs electrode through-hole internal diameter of the CMUT element.

FIG. 10C is a view illustrating the dependency of variable capacitance ratio (active ratio) vs electrode through-hole internal diameter of the CMUT element of this practical example. From FIG. 10B and FIG. 10C, it is evident that when the through-hole radius Rin is, larger than the contact region radius Rc, the capacitance decreases but the variable capacitance ratio (active ratio) increases. For instance, the variable capacitance ratio at a through-hole radius of 4 micrometers is 1, and the variable capacitance ratio at a through-hole radius of 0 micrometers is as low as about 0.21. That is, the reason why the capacitance is large when the through-hole radius is less than the contact region radius is that the capacitance in the contact region is large. However, the vibration membrane in the contact region is unable to vibrate, and provides no variable capacitance, thus resulting in a so-called parasitic capacitance. According to the above-mentioned computation, the parasitic capacitance can be decreased by the provision of the electrode through hole. Further, by setting the through-hole radius to be larger than the contact region radius, the parasitic capacitance substantially disappears or becomes zero, with the result that the variable capacitance ratio reaches a maximum value of 1.

Next, reference will be made to a method for manufacturing a capacitive micromachined ultrasonic transducer (CMUT) according to this example.

FIG. 11A through FIG. 11M are views illustrating the manufacturing processes or steps for the capacitive micromachined ultrasonic transducer (CMUT) in this example.

Figure 11A:
FIG. 11A through FIG. 11M are views illustrating the production processes or steps for the capacitive micromachined ultrasonic transducer (CMUT) in the practical example of the present invention.
Figure 11B:
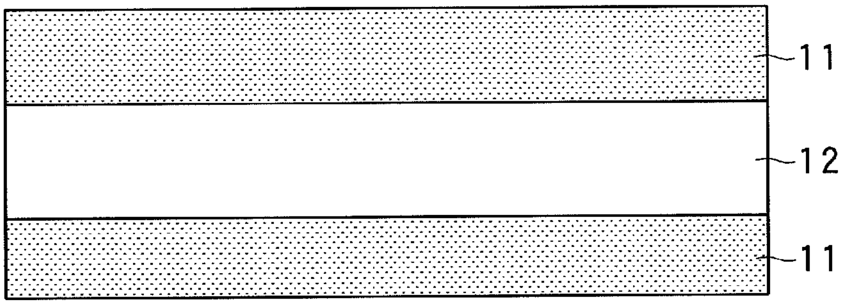
Figure 11C:
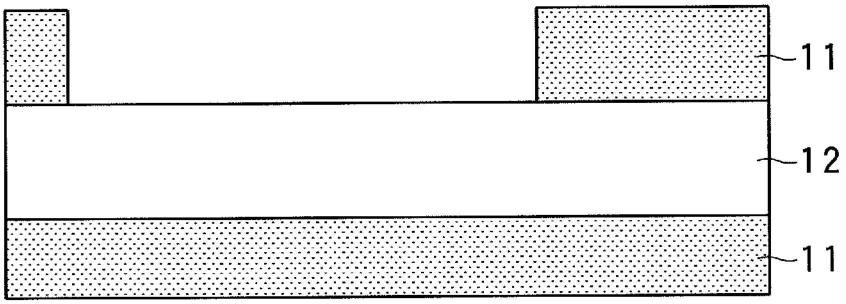
Figure 11D:
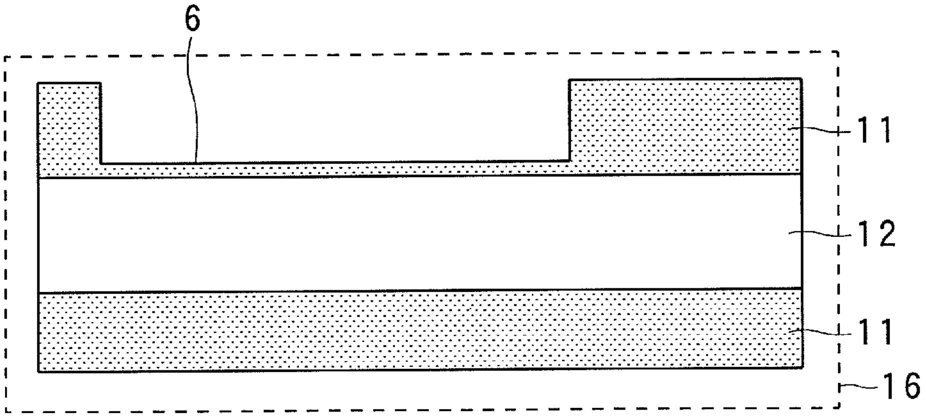

First of all, as shown in FIG. 11A, the Si substrate 12 is washed and prepared. After that, a surface of the Si substrate is made low in resistance by means of a diffusion method or an ion implantation method. Thus, the surface region that has been made low in resistance is incorporated, as the lower electrode 8, into the underlayer substrate, as shown in FIG. 3 described above. The surface resistance value of the Si substrate having been made low in resistance is preferably equal to or less than 10 Ω-cm, more preferably equal to or less than 1 Ω-cm, most preferably equal to or less than 0.1 Ω-cm. Here, the lower electrode 8 is the surface of the substrate 12, and no specific area is illustrated.

The processes or steps in FIG. 11A through FIG. 11D are the same as the processes or steps in FIG. 8A through FIG. 8D in the above-mentioned first embodiment, and a completed substrate is called an A substrate 16.

Figure 11E:
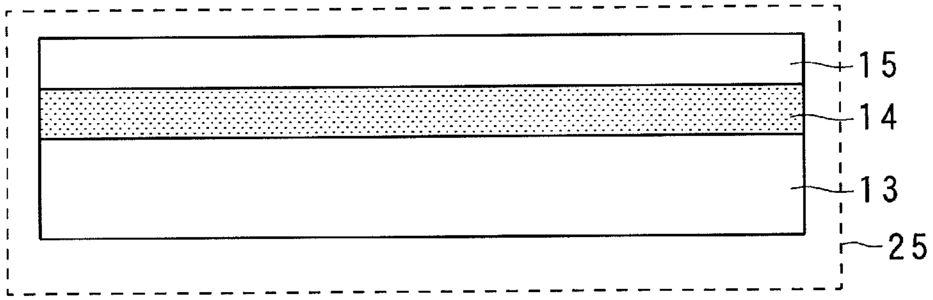

As shown in FIG. 11E, one SOI substrate (e.g., SIMOX SOI substrate or Smart-Cut SOI substrate) is washed and prepared. This substrate is called a C substrate 25.

Figure 11F:
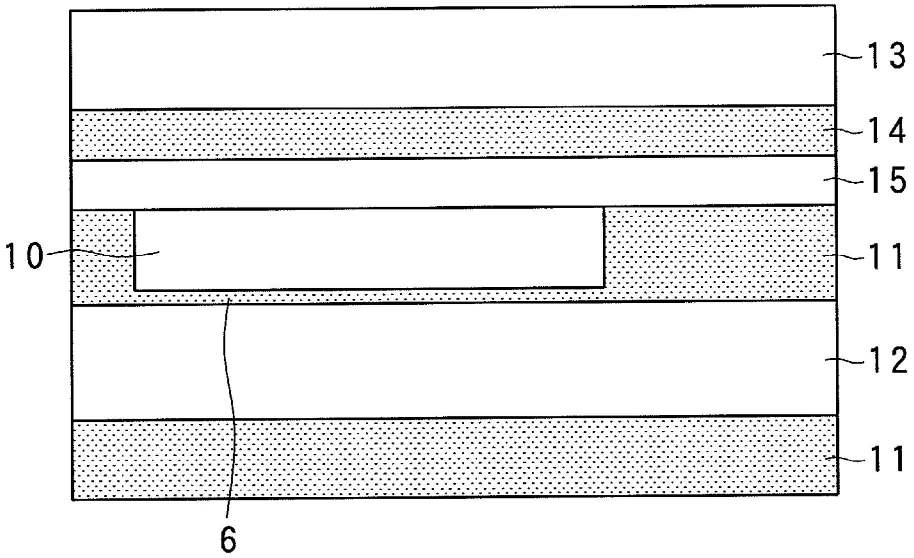

Then, as shown in FIG. 11F, the rear and the front of the C substrate 25 are reversed, and joined or bonded to the A substrate 16, whereby a cavity 10 is formed. In the bonding process, there is no need for alignment. Here, note that in the bonding process, the surface of a bonding surface is activated at room temperature, and the handing is performed at a temperature of 150 degrees C. or less and at a pressure of $10^{-3}$ Pa (e.g., EVG 810, 520 manufactured by EVG).

Subsequently, the handling layer 13 of the substrate thus joined or bonded as described and shown in FIG. 11F is ground in such a manner that the handling layer 13 having a thickness of about several tens micrometers is left and washed. After that, the handling layer 13 is etched by a KOH liquid of 80 degrees C. while protecting the rear surface of the ground substrate with the use of a single-sided etching jig (e.g., a wafer holder manufactured by Silicet AG in Germany).

Figure 11G:
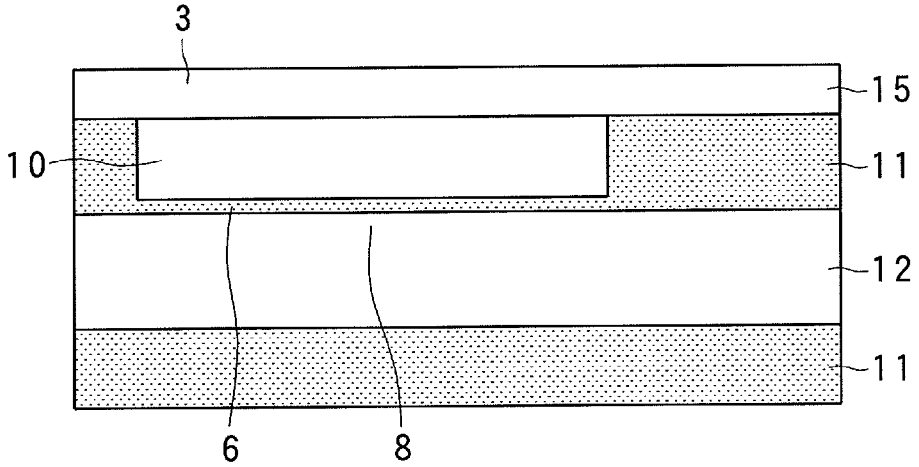

Thereafter, the BOX layer 14 is etched by means of liquid containing fluorine, so that the device layer 15 is exposed, as shown in FIG. 11G. This device layer 15 is used as the vibration membrane 3 of this embodiment.

Figure 11H:
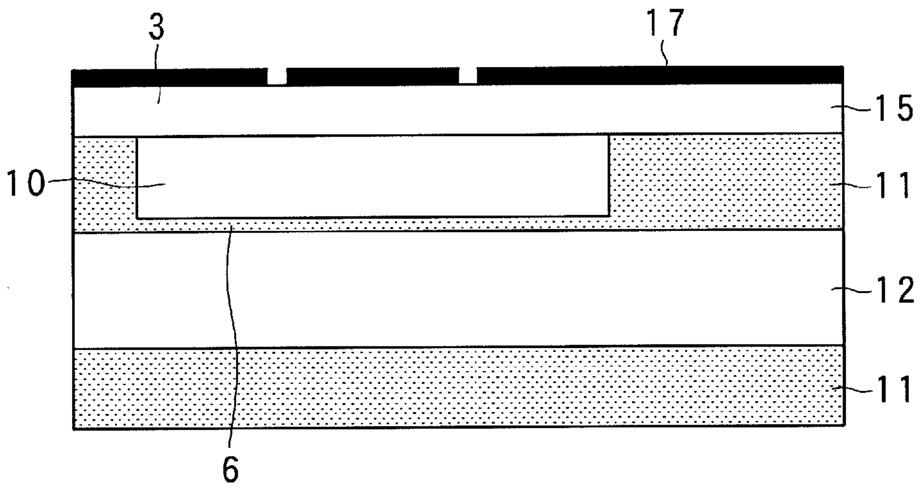

Then, as shown in FIG. 11H, the SiN film 17 is deposited according to the LPCVD method, and is subjected to patterning by means of dry etching.

Figure 11I:
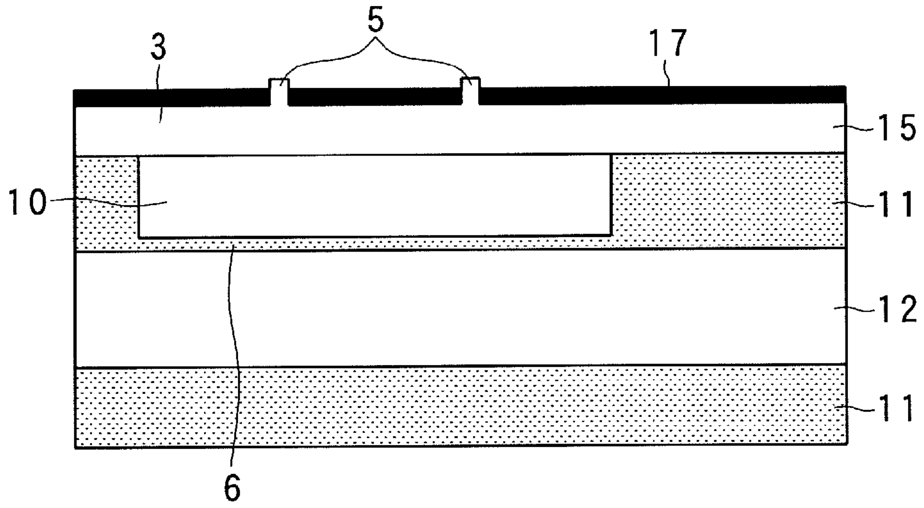

Subsequently, as shown in FIG. 11I, the protrusions 5 are caused to grow by means of an epitaxy method. The protrusions 5 grow up from the Si surface of the device layer 15 exposed to the SiN film 17. The height of the protrusions 5 thus grown is preferably in the range of from 1 nm to 1,000 nm, more preferably in the range of from 5 nm to 500 nm, and most preferably in the range of from 10 nm to 200 nm. Here, note that a method of growing a crystal only from an exposed place as described above is called a selective epitaxy. It is also possible to use a SiO film, a SiON film or the like in place of the patterned SiN film 17.

Here, note that as the above-mentioned epitaxy method, there can be used one of an MBE (Molecular Beam Epitaxy) method, an LPE (Liquid Phase Epitaxy) method, an SPE (Solid Phase Epitaxy) method and so on.

Also, as the above-mentioned selective epitaxy method, there can be used alternative methods. For instance, the above-mentioned pattering of the protrusions 5 can be performed by the use of a PVD (Physical Vapor Deposition) method or a CVD (Chemical Vapor Deposition) method, and by adding an etching method or a lift-off method.

Figure 11J:
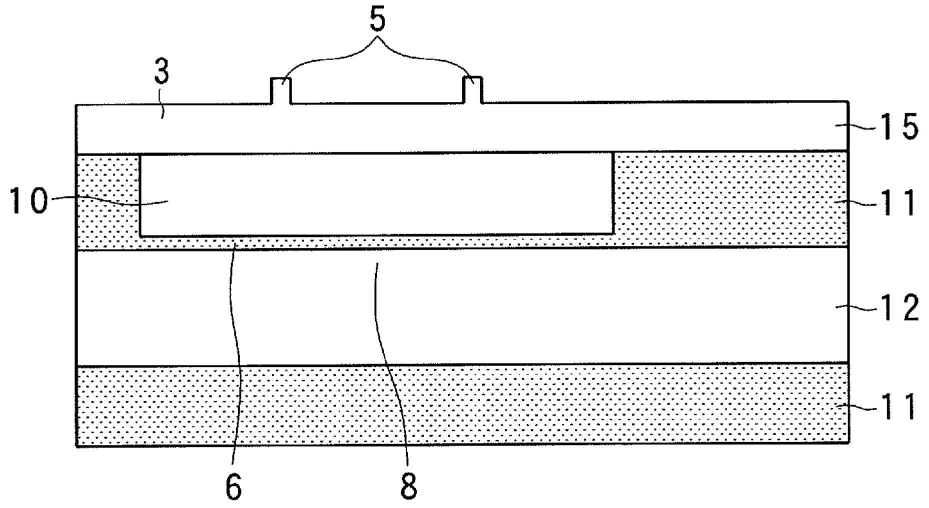

Thereafter, the above-mentioned SiN film 17 is removed by etching with the use of a liquid containing phosphoric acid of about 160 degrees C., whereby the vibration membrane 3 provided with the protrusions 5 is completed, as shown in FIG. 11J. Here, note that in this embodiment, the shape of the vibration membrane 3 has a thickness of 340 nm, and is a square having each side of about 40 micrometers. Also, the amount of displacement of the central portion of the vibration membrane 3 by atmospheric pressure is about 360 nm. In addition, the above-mentioned substrate is placed in an autoclave, and the central portion of the vibration membrane 3 is brought into contact with the insulation film 6 under the cavity 10 by applying a pressure of about 2.65 atm or higher in case where the height of the cavity 10 is 600 nm. The distribution or arrangement of the protrusions 5 is substantially in the shape of a ring or circle having an internal diameter of 4 micrometers and a width of about 2 micrometers, at the center of the vibration membrane 3 as shown in FIG. 9B.

In the case of applying an external pressure of 4 atm, the central portion of the vibration membrane 3 is placed in contact with the insulation film 6, whereby a contact region 9 haying a diameter of 4 micrometers, substantially the same as that of the circularly arranged protrusions 5 is formed. Here, note that in case where the protrusions 5 are not provided, the size of the contact region 9 depends strongly on the distribution of the external pressure, minute pressure variation, and the size and the boundary conditions of the vibration membrane 3, so the difference or variation between elements (transducers) becomes great. On the other hand, by the provision of the protrusions 5, it is possible to form the contact region 9 with substantially the same shape as the distributed or arranged shape of the protrusions 5 even if there is a difference or variation between the elements.

Figure 11K:
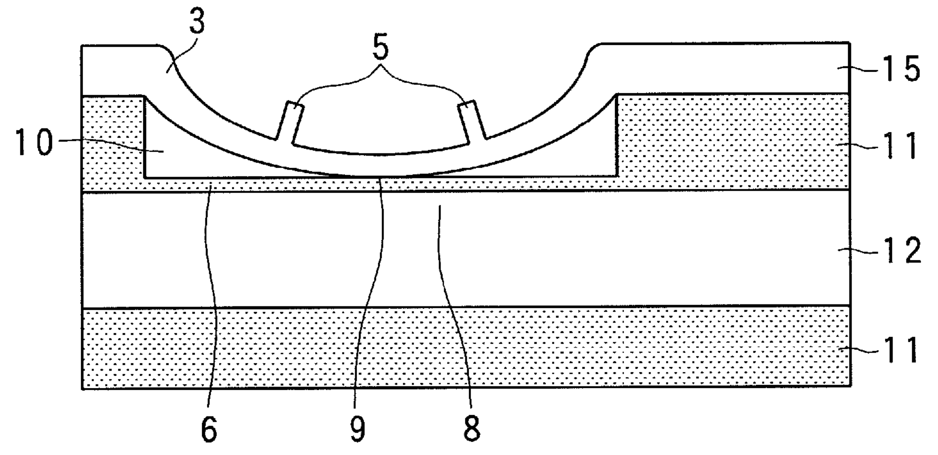

By applying the external pressure as described in FIG. 8K and a temperature of about 800 degrees C., a plastic phenomenon appears to Si, whereby an element having the contact region 9 formed therein, as shown in FIG. 11K, is completed. The thus completed element, even if returned to room temperature, can keep its state in which the vibration membrane is in contact with the substrate, so it can be made to operate as a collapse mode without any external force being applied thereto.

Figure 11L:
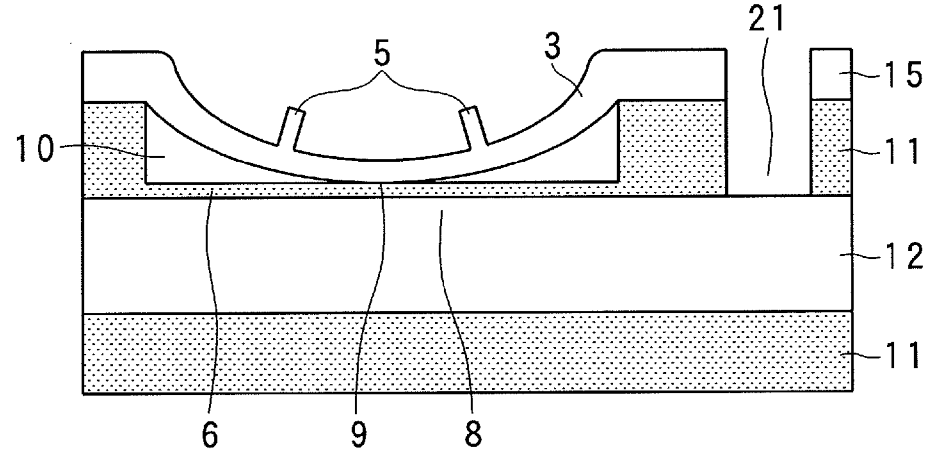

Then, the device layer 15 forming the vibration membrane 3 is patterned near the outer edge of the vibration membrane 3 by means of dry etching. After that, an oxide film 11 is directly patterned by means of wet etching without removing a photoresist for the patterning of the device layer 15. An etching hole 21 is formed according to the above-mentioned process, as shown in FIG. 11L.

Figure 11M:
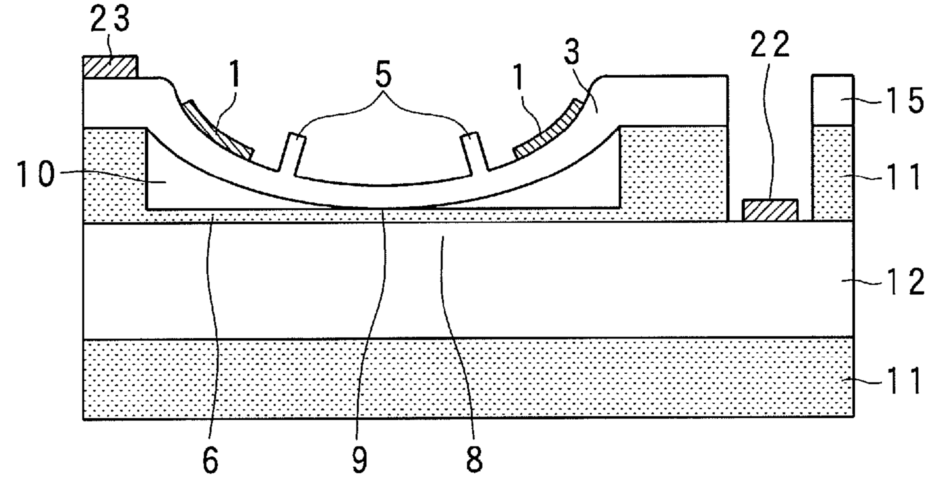

Subsequently, Al for electrodes is deposited by sputtering, and is then subjected to patterning by means of wet etching, whereby an upper electrode 1, an upper electrode pad 23 and a lower electrode pad 22 are formed, as shown in FIG. 11M.

Here, note that the pattern of the upper electrode 1 is formed into a ring shape, and the internal diameter thereof is made larger than the shape of the protrusions 5. That is, since the through-hole radius of the upper electrode 1 is made larger than the above-mentioned contact region radius, the above-mentioned variable capacitance ratio (active ratio) is a maximum value of 1.

Here, note that the above-mentioned Al electrodes can thereafter be annealed to form ohmic contact. It is preferred that the temperature of the annealing be in the range of from 200 degrees C. to 450 degrees C. This is the temperature range of annealing when ordinary Al electrodes perform ohmic contact.

Finally, in order to electrically separate or isolate multi-elements in this embodiment, the device layer 15 is patterned to complete an element array. However, it is omitted here to illustrate such electric separation or isolation. Moreover, a passivation layer for electrical wiring or the electrical wiring for the upper electrode 1 and the upper electrode pad 23 or the like to be formed thereon are not shown in the figure. Here, it is preferred that the above-mentioned passivation layer be composed of a SiO film or a SiN film which can be formed at low temperature by means of a PVD method.

The present invention is not limited to the above embodiments, and various changes and modifications can be made within the spirit and scope of the present invention. Therefore, to apprise the public of the scope of the present invention, the following claims are made.

This application claims the benefit of Japanese Patent Application No. 2007-246920, filed on Sep. 25, 2007, which is hereby incorporated by reference herein in its entirety. This application claims the benefit of Japanese Patent Application No. 2008-236379, filed on Sep. 16, 2008, which is hereby incorporated by reference herein in its entirety.

The invention claimed is:

1. An electromechanical transducer comprising:

a vibration membrane provided with a first electrode;

a substrate provided with a second electrode; and a support member adapted to support said vibration membrane in such a manner that a gap is formed between said vibration membrane and said substrate, with the first and second electrodes being arranged in opposition to each other;

wherein a part of said vibration membrane and a part of said substrate are in contact with each other at a contact region, and another region of said vibration membrane other than the contact region is able to vibrate;

a first region is provided within the contact region, with at least one of the first electrode and second electrode not formed in the first region; and a plurality of protrusions formed within the gap and on at least one of said vibration member and said support member, wherein the contact region is surrounded by the plurality of protrusions, the protrusions are not formed in a central part of the vibration membrane, and the central part of the vibration membrane and the substrate are in contact with each other.

2. The electromechanical transducer according to claim 1, wherein the contact region is maintained without an external force being applied to said vibration membrane.

3. The electromechanical transducer according to claim 2, wherein in the contact region, said vibration membrane is fusion bonded to said substrate.

4. The electromechanical transducer according to claim 1, wherein said protrusions have a height in a range of from 10 nm to 200 nm.

5. The electromechanical transducer according to claim 1, wherein said protrusions are arranged in a ring shape so as to surround the contact region.

6. The electromechanical transducer according to claim 1, wherein said vibration membrane serves as said first electrode.

7. The electromechanical transducer according to claim 1, wherein said substrate serves as said second electrode.

8. A method for manufacturing an electromechanical transducer, in which the electromechanical transducer includes a vibration membrane provided with a first electrode, a substrate provided with a second electrode, and a support member adapted to support the vibration membrane in such a manner that a gap is formed between the vibration membrane and the substrate, with the first and second electrodes being arranged in opposition to each other the method comprising:

a step of providing a contact region where a part of the vibration member and a part of the substrate are in contact with each other, and providing another region where the vibration membrane is able to vibrate; and a step of providing a first region within the contact region, with at least one of the first electrode and second electrode not formed in the first region;

a step of forming a plurality of protrusions within the gap and on at least one of the vibration member and the support member; and a step of locating the plurality of protrusions to surround the contact region, wherein the protrusions are not formed in a central part of the vibration membrane, and the central part of the vibration membrane and the substrate are in contact with each other.

9. The method for manufacturing an electromechanical transducer according to claim 8, further comprising a step of forming a structure in which the vibration membrane is caused to plastically deform in such a manner that a part of the vibration membrane is made to operate in a collapse mode while maintaining the contact region of the substrate including the second electrode.

10. The method for manufacturing an electromechanical transducer according to claim 9, further comprising a step of fusion bonding a part of the vibration membrane that has been plastically deformed to the substrate at the contact region.

11. The method for manufacturing an electromechanical transducer according to claim 8, wherein the protrusions have a height in a range of from 10 nm to 200 nm.

12. The method for manufacturing an electromechanical transducer according to claim 8, wherein the protrusions are formed in a ring shape so as to surround the contact region.

13. The method for manufacturing an electromechanical transducer according to claim 8, wherein the vibration membrane serves as the first electrode.

14. The method for manufacturing an electromechanical transducer according to claim 8, wherein the substrate serves as the second electrode.

* * * * *